United States Patent
Abe et al.

(10) Patent No.: US 7,092,813 B2
(45) Date of Patent: Aug. 15, 2006

(54) FUEL INJECTION CONTROL OF ENGINE

(75) Inventors: Kazuhiko Abe, Kawasaki (JP); Hatsuo Nagaishi, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/242,948

(22) Filed: Oct. 5, 2005

(65) Prior Publication Data

US 2006/0080024 A1   Apr. 13, 2006

(30) Foreign Application Priority Data

| Oct. 8, 2004 | (JP) | ............................. 2004-296849 |
| Oct. 8, 2004 | (JP) | ............................. 2004-296860 |
| Oct. 8, 2004 | (JP) | ............................. 2004-296866 |
| Oct. 8, 2004 | (JP) | ............................. 2004-296869 |

(51) Int. Cl.
*G06F 19/00* (2006.01)
*F02M 51/00* (2006.01)

(52) U.S. Cl. ....................... 701/104; 123/478; 123/480; 701/110

(58) Field of Classification Search ................ 701/101, 701/103, 104, 105, 110; 123/478, 480, 488, 123/399, 500, 434, 436, 675, 704

See application file for complete search history.

(56) References Cited

U.S. PATENT DOCUMENTS

| 5,438,827 A * | 8/1995 | Ohuchi et al. ................ 60/276 |
| 6,199,537 B1 * | 3/2001 | Kowatari et al. ........... 123/399 |
| 6,386,182 B1 * | 5/2002 | Kowatari et al. ........... 123/399 |
| 6,497,214 B1 * | 12/2002 | Yagi ............................. 123/399 |
| 6,612,292 B1 * | 9/2003 | Shirakawa .................... 123/501 |
| 6,625,985 B1 * | 9/2003 | Shirakawa .................... 60/602 |
| 6,658,847 B1 * | 12/2003 | Shirakawa .................... 60/602 |
| 2002/0189254 A1 * | 12/2002 | Shirakawa .................... 60/602 |
| 2003/0051474 A1 * | 3/2003 | Shirakawa .................... 60/602 |
| 2003/0075147 A1 * | 4/2003 | Kowatari et al. ........... 123/399 |

FOREIGN PATENT DOCUMENTS

| JP | 1-305144 A | 12/1989 |
| JP | 11-2140 A | 1/1999 |
| JP | 2001-50091 A | 2/2001 |
| JP | 2003-65131 A | 3/2003 |
| JP | 2003-129871 A | 5/2003 |
| JP | 2003-314347 A | 11/2003 |

* cited by examiner

*Primary Examiner*—John T. Kwon
(74) *Attorney, Agent, or Firm*—Foley & Lardner LLP

(57) ABSTRACT

In an internal combustion engine (1), air is taken into a cylinder (5) from an intake passage (30) through an intake valve (15). The amount of air taken into the cylinder (5) is controlled to a target intake air amount by having an engine controller (31) operate an intake throttle (23) in accordance with an accelerator opening (APO), taking into account a predetermined response delay (T2). The engine controller (31) calculates a predicted value (Qc1) of the intake air amount on the basis of the accelerator opening (APO), and controls a fuel injector (21) to inject fuel in a target fuel injection amount (Ti) which corresponds to this predicted value (Qc1) at a predetermined timing. In so doing, an improvement is achieved in the degree of precision with which air-fuel ratio control is performed when the internal combustion engine (1) accelerates or decelerates.

16 Claims, 12 Drawing Sheets

32 AIR FLOW METER
33 CRANK ANGLE SENSOR
34 CYLINDER DETERMINATION SENSOR
35 OXYGEN SENSOR
36 THROTTLE OPENING SENSOR
42 ACCELERATOR PEDAL DEPRESSION AMOUNT SENSOR
43 ATMOSPHERIC PRESSURE SENSOR
44 TEMPERATURE SENSOR

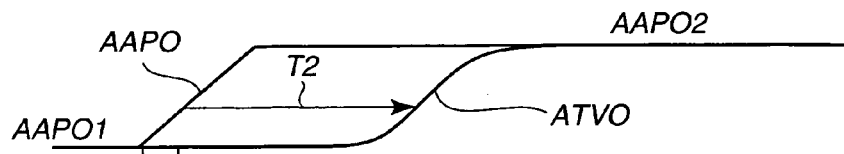
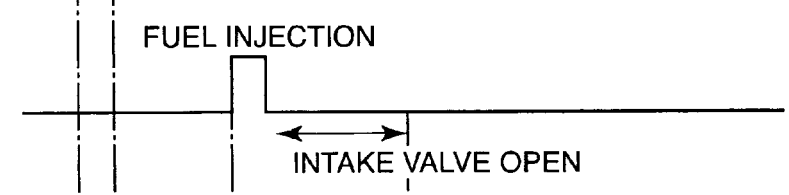
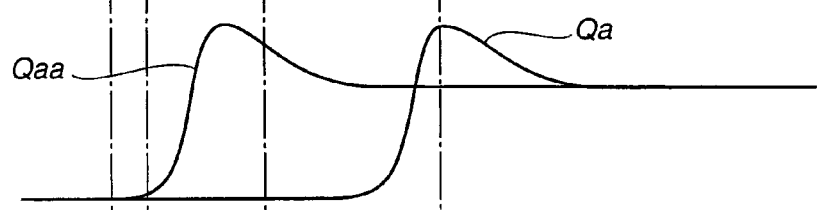
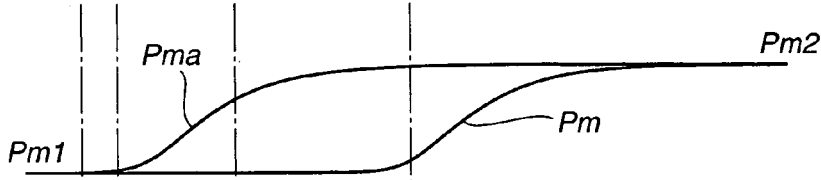
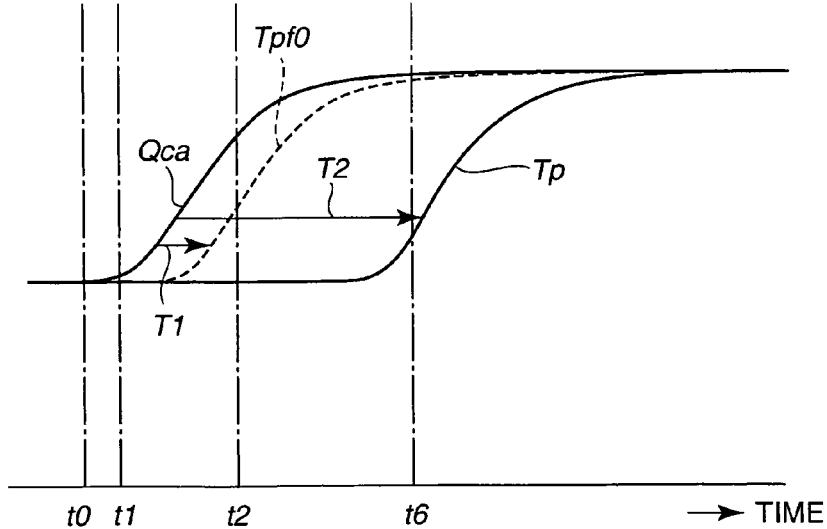

US 7,092,813 B2

FUEL INJECTION CONTROL OF ENGINE

FIELD OF THE INVENTION

This invention relates to fuel injection control of an internal combustion engine in a transitional state.

BACKGROUND OF THE INVENTION

In an internal combustion engine, a time lag occurs between an acceleration operation, for example, and the time at which the amount of air taken into the engine cylinders actually increases. When the engine is running normally and fuel is injected through a fuel injector in an amount corresponding to a target fuel injection amount, which is calculated from an intake air flow rate detected by an air flow meter provided upstream of an intake throttle, and a target air-fuel ratio, the air-fuel mixture in the engine reaches the stoichiometric air-fuel ratio. However, during transitional operating periods of the engine, such as acceleration and deceleration, the air-fuel mixture in the cylinder deviates temporarily from the stoichiometric air-fuel ratio due to the delay in change of the intake air amount.

JP01-305144A, published by the Japan Patent Office in 1989, proposes a fuel injection amount calculation method for ensuring that the air-fuel mixture supplied to a cylinder matches a target air-fuel ratio even during transitional operating periods of an internal combustion engine for a vehicle. More specifically, an intake air amount per combustion cycle of the cylinder is calculated from a detected flow rate, detected by an air flow meter, and a target fuel injection amount corresponding to the intake air amount of the cylinder is calculated from this intake air amount and the stoichiometric air-fuel ratio. Moreover, in this prior art, the target fuel injection amount is applied at a timing advanced by ten milliseconds from the closing of an intake valve.

SUMMARY OF THE INVENTION

Delay processing is implemented when the intake air amount per combustion cycle of the cylinder is calculated from the air flow meter-detected flow rate. In other words, the intake air amount of the cylinder is calculated before the air is actually taken into the cylinder. In so doing, it is possible to apply the fuel injection amount, which is based on the calculation result, before closing the intake valve.

In relation to an acceleration operation of an internal combustion engine, if the fuel injection amount application timing, which is advanced by ten milliseconds from the closing of the intake valve, is earlier than the actual fuel injection timing, the calculated fuel injection amount can be reflected in the actual fuel injection. However, if the fuel injection amount application timing, advanced by ten milliseconds from the closing of the intake valve, is later than the injection timing, fuel injection is performed using the fuel injection amount calculated during the previous combustion cycle. In the latter case, the actual air-fuel ratio of the air-fuel mixture in the cylinder inevitably shifts to the lean side when the internal combustion engine accelerates.

To solve this problem, the application timing of the calculated fuel injection amount value may be advanced greatly. However, this advancement operation is performed as a correction of the delay processing performed during calculation of the intake air amount in the cylinder from the air flow meter-detected flow rate. Therefore, the application timing can only be advanced within the range of the delay processing. To put it more simply, the fuel injection amount cannot be calculated before the air flow meter detects an increase in the air flow rate. Hence, the operation to advance the application timing of the calculated fuel injection amount value is limited to a narrow range, and the effect on the precision of air-fuel ratio control is also limited.

It is therefore an object of this invention to further improve the precision of air-fuel ratio control in an internal combustion engine during transitional operating periods.

In order to achieve the above object, this invention provides a fuel injection control device for such an internal combustion engine that comprises a cylinder, an intake passage through which air is taken into the cylinder, an intake air amount regulating mechanism which regulates an intake air amount of the cylinder in accordance with an accelerator opening, and a fuel injector which supplies the intake air with an amount of fuel corresponding to the intake air amount, wherein a predetermined response delay exists between the accelerator opening and the intake air amount adjustment performed by the intake air amount regulating mechanism, The fuel injection control device comprises a programmable controller programmed to calculate from the accelerator opening a predicted value of the intake air amount of the cylinder that is to be realized by the intake air amount regulating mechanism, calculate a target fuel injection amount in accordance with the predicted value, and control the fuel injector to inject a fuel in the target fuel injection amount at a predetermined injection timing.

This invention also provides a fuel injection control method for the above internal combustion engine. The method comprises calculating from the accelerator opening a predicted value of the intake air amount of the cylinder that is to be realized by the intake air amount regulating mechanism, calculating a target fuel injection amount in accordance with the predicted value, and controlling the fuel injector to inject a fuel in the target fuel injection amount at a predetermined injection timing.

The details as well as other features and advantages of this invention are set forth in the remainder of the specification and are shown in the accompanying drawings.

BRIEF DESCRIPTION OF THE DRAWINGS

FIGS. 6A–6E are timing charts illustrating the content of calculations for calculating a fuel injection amount during engine acceleration, which are executed by the engine controller according to the first embodiment and second embodiment of this invention.

DESCRIPTION OF THE PREFERRED EMBODIMENTS

Figure 1:
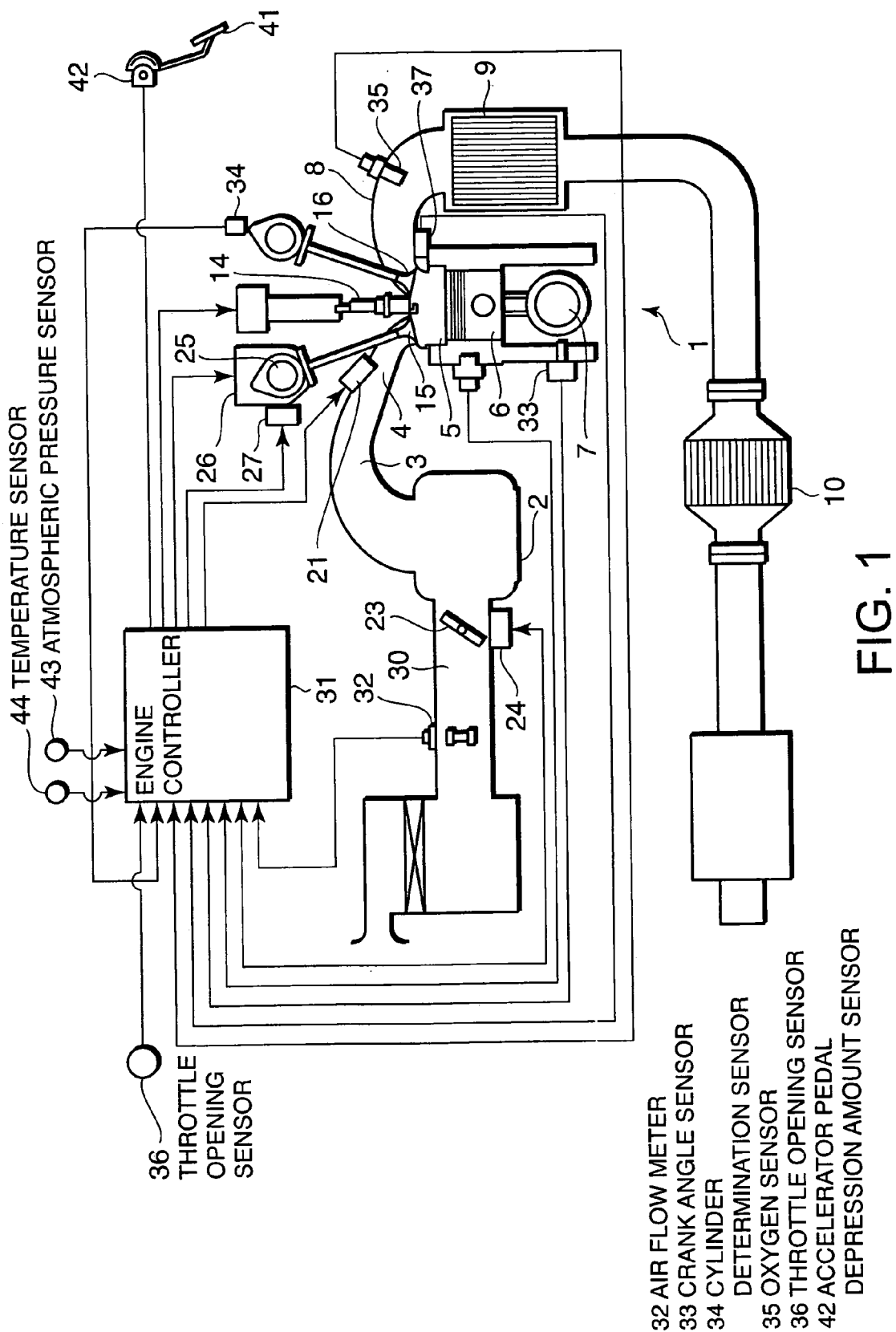
FIG. 1 is a schematic diagram of an internal combustion engine to which fuel injection control according to this invention is applied.

Referring to FIG. 1 of the drawings, in an internal combustion engine 1 for a vehicle, air that flows in through an intake throttle 23 of an intake passage 30 is stored temporarily in an intake air collector 2, and then the air flows from an intake manifold 3 into each cylinder 5 through an intake port 4. The intake air amount of each cylinder 5 depends on the opening of the intake throttle 23. The intake throttle 23 is driven by a throttle motor 24 which operates in conjunction with an output signal from an engine controller 31. A fuel injector 21 provided in the intake port 4 injects fuel into the intake air in each intake port 4 in an amount corresponding to the pulse width of a pulse signal output by the engine controller 31, and at a timing corresponding to the output timing of the pulse signal. The intake throttle 23 corresponds to the intake air amount regulating mechanism in the claims.

The fuel injection amount of the fuel injector 21 is set by the engine controller 31.

The fuel injected into the intake port 4 mixes with the air to generate an air-fuel mixture. The air-fuel mixture is taken into the cylinder 5 from the intake port 4 when an intake valve 15 is opened, and sealed inside the cylinder 5 when the intake valve 15 is closed. The air-fuel mixture sealed inside the cylinder 5 is compressed when a piston 6 rises, and burned when a spark plug 14 ignites. The piston 6 is pushed downward by the pressure of the combustion gas, and thus the piston 6 is caused to perform a reciprocating motion, which causes a crankshaft 7 joined to the piston 6 to rotate. After the piston 6 has been pushed down, the combustion gas is discharged into an exhaust passage 8 as exhaust gas by the piston 6, which rises again when an exhaust valve 16 is opened.

The exhaust gas in the exhaust passage 8 is purified by three-way catalysts 9 and 10, and then discharged into the atmosphere. When the air-fuel ratio of the air-fuel mixture burned in the cylinder 5 is within a narrow range centered on the stoichiometric air-fuel ratio, the three-way catalysts are able to remove hydrocarbons (HC), carbon monoxide (CO), and nitrogen oxides (NOx) contained in the exhaust gas simultaneously and effectively.

For this purpose, the engine controller 31 determines a basic injection amount of the fuel injector 21 in accordance with the operating conditions of the engine 1, and feedback-controls the air-fuel ratio of the air-fuel mixture inside the cylinder 5 to the stoichiometric air-fuel ratio on the basis of the air-fuel ratio of the air-fuel mixture burned in the cylinder 5, which is detected by an oxygen sensor 35 provided upstream of the three-way catalyst 9 from the oxygen concentration of the exhaust gas.

The engine controller 31 is constituted by a microcomputer comprising a central processing unit (CPU), read-only memory (ROM), random access memory (RAM), and an input/output interface (I/O interface). The controller may be constituted by a plurality of microcomputers.

The intake throttle 23 is driven by the throttle motor 24. The torque demanded of the engine 1 by the driver of the vehicle is input as a depression amount of an accelerator pedal 41. An accelerator pedal depression amount sensor 42 detects the accelerator pedal depression amount as an accelerator opening APO, and inputs this into the engine controller 31. Hence in the internal combustion engine 1 to which this invention is applied, the intake throttle 23 is driven by the throttle motor 24 in accordance with a signal from the engine controller 31, rather than operating in mechanical response to the accelerator pedal 41.

The engine controller 31 determines a target torque of the internal combustion engine 1 on the basis of the accelerator opening APO, and determines a target air amount for realizing the target torque. Then, to obtain the target air amount, the engine controller 31 adjusts the opening of the intake throttle 23, via the throttle motor 24, to a target opening. During this control, a slight time lag occurs from detection of the accelerator opening APO to adjustment of a throttle opening TVO of the intake throttle 23 to the target opening corresponding to the accelerator opening APO. The throttle opening TVO of the intake throttle 23 is detected by a throttle opening sensor 36.

Detection data are also input as signals into the engine controller 31 from an atmospheric pressure sensor 43 which detects the atmospheric pressure, a temperature sensor 44 which detects the temperature of an intake manifold 3, a cylinder determination sensor 34 which determines the stroke of each cylinder 5, an air flow meter 32 which detects the intake air flow rate in the intake passage 30, and a crank angle sensor 33 which detects a predetermined rotation position of the engine and an engine rotation speed Ne, respectively. A fuel injection control device is constituted by these sensors 32, 33, 34, 35, 36, 42, 43, 44, and the engine controller 31.

Next, referring to FIGS. 2A–2C, the concept of the fuel injection control according to this invention, which is executed when the internal combustion engine 1 accelerates, will be described.

Figure 2A:
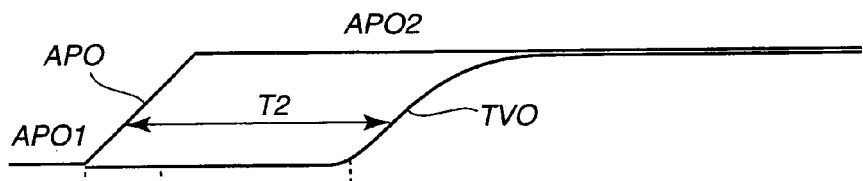
FIGS. 2A–2C are timing charts illustrating the concept of the fuel injection control during engine acceleration according to this invention.

As shown in FIG. 2A, the driver presses the accelerator pedal 41 such that at a time t1, the accelerator opening APO begins to increase from a first opening APO1 to a second opening APO2. As noted above, a delay exists between change in the accelerator opening APO and change in the throttle opening TVO of the intake throttle 23. Here, the throttle opening TVO begins to increase at a time t4. Moreover, although the air flow rate in the intake passage 30 increases due to the increase in the throttle opening TVO, the intake air is held temporarily in the collector 2 and then taken into the cylinder 5 from the intake manifold 3, and therefore the intake air amount of the cylinder 5 begins to increase at an even later time t5. The amount of air that is taken into the cylinder 5 will be referred to as a cylinder intake air amount Qc.

An object of this invention is to improve the air-fuel ratio control precision by eliminating the discrepancy between change in the intake air amount and change in the fuel injection amount during transitional operating periods such as acceleration. Hence in FIG. 2C, the cylinder intake air amount Qc and a required fuel injection amount Tpf are drawn at the same height for ease of description. In actuality, at the stoichiometric air-fuel ratio the intake air amount is 14.7 in relation to a fuel injection amount of 1. Furthermore, the unit of the cylinder intake air amount Qc is grams/cycle, whereas the unit of the required injection amount Tpf is milliseconds. Hence the cylinder intake air amount Qc and required injection amount Tpf use different units, but since the only issue here is the increase timing, this difference in units is ignored for ease of notation. As a result, the waveforms of the cylinder intake air amount Qc and required injection amount Tpf take the same shape, and only a deviation in the temporal axis direction exists between the two.

Specifically, a response delay period T2 in the operation from the beginning of change in the accelerator opening APO at the time t0 to the beginning of change in the throttle opening TVO of the intake throttle 23 at the time t4 lasts between forty and fifty milliseconds. The basic concept of this invention is to calculate the fuel injection amount on the basis of the accelerator opening APO instead of the flow rate detected by the air flow meter 32 so that the required injection amount Tpf can be calculated before the throttle opening TVO begins to change. In the following description, the response delay period T2 will be referred to as a wasted time period T2.

Figure 2B:
Figure 2C:
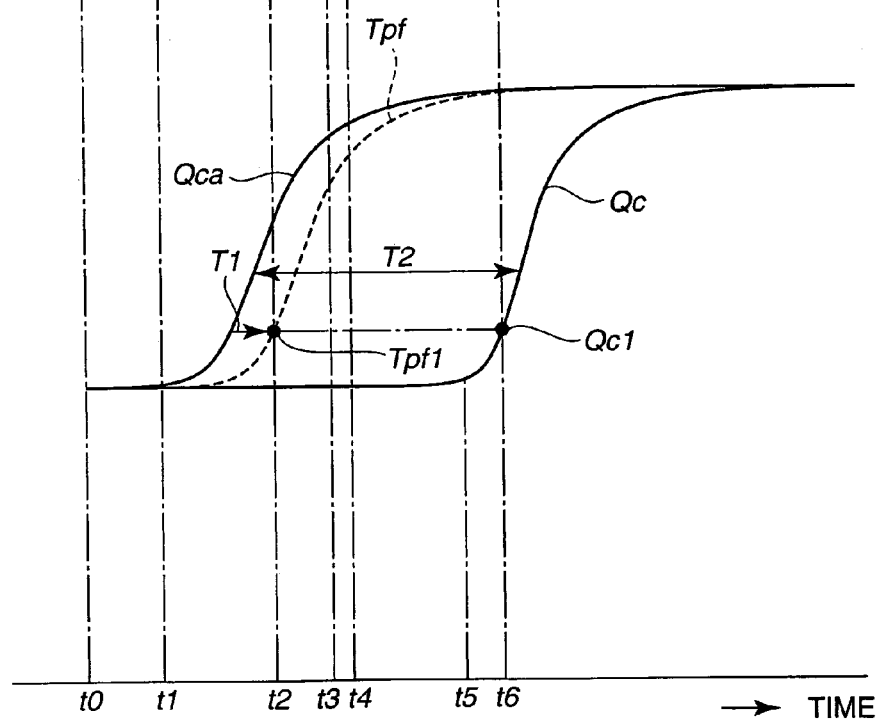

For this purpose, the engine controller 31 inserts advancement processing as shown in FIG. 2C using the wasted time period T2 until the phase of change in the cylinder intake air amount Qc matches the phase of change in the accelerator opening APO. The value following this processing is set as a cylinder intake air amount Qca corresponding to the accelerator opening. The wasted time period T2 is set in advance as a fixed value. The engine controller 31 also adds delay processing to the cylinder intake air amount Qca corresponding to the accelerator opening using a wasted time period T1 for synchronizing the cylinder intake air amount Qca corresponding to the accelerator opening with the injection timing, and thus obtains the required injection amount Tpf shown by the broken line in FIG. 2C.

Each of the curves in FIG. 2C shows a value calculated from change in the accelerator opening APO, and does not take into account opening and closing of the intake valve 15. In actuality, as shown in FIG. 2B, the intake valve 15 closes at a time t6, and therefore a value Qc1 of the cylinder intake air amount Qc at the time t6 is the actual intake air amount in the cylinder 5. A value Tpf1 at the time t2 on the required injection amount Tpf curve denotes the required injection amount corresponding to the actual intake air amount. Hence in actuality, the engine controller 31 calculates the value Tpf1 at the time t2.

In FIGS. 2A–2C, it is assumed that a rotation speed Ne of the internal combustion engine 1 takes a fixed value N0, and that an injection timing IT corresponds to the time t2, which is slightly later than the time t0. The intake valve 15 is open from the time t3 to the time t6, and the injection timing IT is set immediately prior to the intake stroke. This relationship stands for all of the cylinders 5.

The abscissa in FIGS. 2A–2C is a temporal axis, and therefore when the engine rotation speed Ne changes, the injection timing IT also changes. More specifically, when the engine rotation speed Ne falls below the fixed value N0, the injection timing IT becomes later than the timing t2 in the drawing, and hence moves to the right of the drawing. When the engine rotation speed Ne rises above the fixed value N0, the injection timing IT becomes earlier than the timing t2 in the drawing, and hence moves to the left of the drawing. The wasted time period T1 changes in conjunction with this variation in the engine rotation speed Ne. In other words, the wasted time period T1 is a function of the engine rotation speed Ne.

Figure 5:
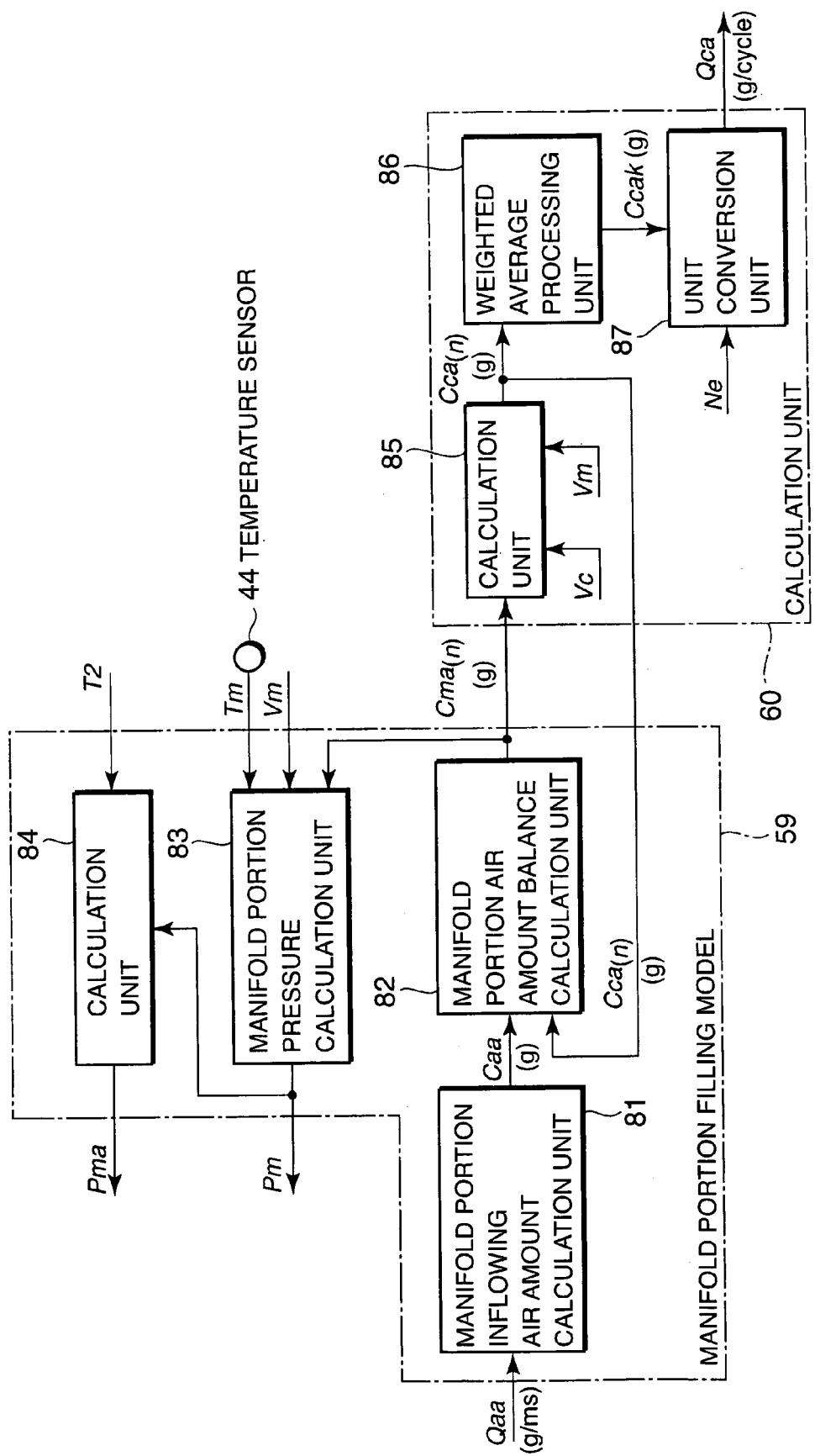
FIG. 5 is a block diagram illustrating functions of the engine controller according to the first embodiment and second embodiment of this invention for calculating a manifold portion air amount and a cylinder intake air amount corresponding to an accelerator opening.

The functions of the engine controller 31 for realizing the fuel injection control described above will now be described with reference to the block diagrams in FIGS. 3 and 5.

Figure 3:
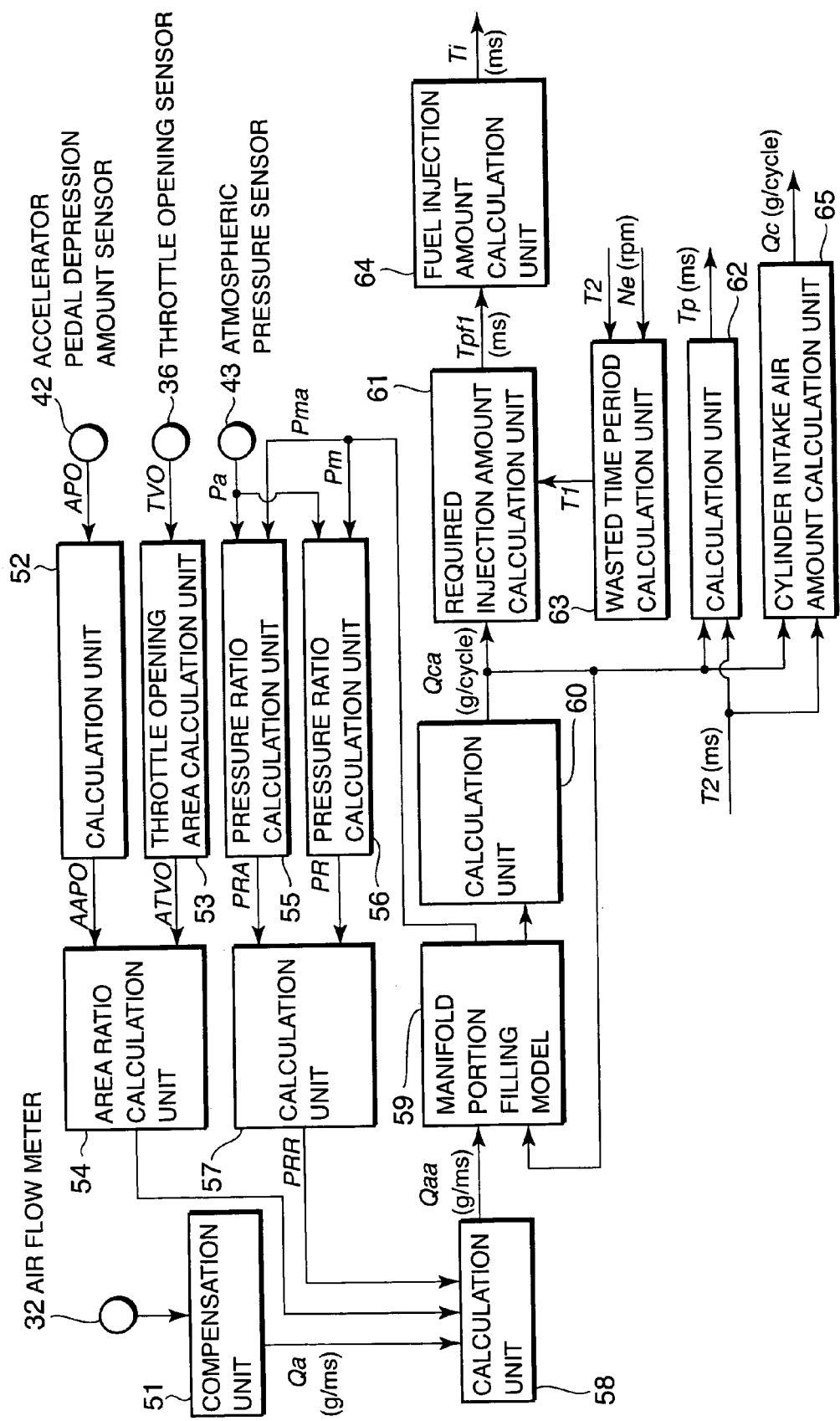
FIG. 3 is a block diagram illustrating functions of an engine controller according to a first embodiment of this invention for calculating a fuel injection amount Ti.

Referring to FIG. 3, in order to calculate the fuel injection amount Ti, the engine controller 31 comprises a compensation unit 51 which compensates for delay and advancement in the output of the air flow meter, a calculation unit 52 which calculates a throttle opening area conversion value of the accelerator pedal depression amount, a throttle opening area calculation unit 53, an area ratio calculation unit 54, pressure ratio calculation units 55 and 56, a calculation unit 57 for calculating the ratio between the two pressure ratios, a calculation unit 58 for calculating the flow rate corresponding to the accelerator opening, a manifold portion filling model 59, a calculation unit 60 for calculating the cylinder intake air amount corresponding to the accelerator opening, a required injection amount calculation unit 61, a calculation unit 62 for calculating the injection amount corresponding to the cylinder intake air amount, a wasted time period calculation unit 63, a fuel injection amount calculation unit 64, and a cylinder intake air amount calculation unit 65. It should be noted that each block in FIG. 3 shows a function of the engine controller 31 as a virtual unit, and hence these blocks do not exist physically.

Using these calculation units 51–65, the engine controller 31 calculates the fuel injection amount Ti milliseconds (ms) at one millisecond intervals while the internal combustion engine 1 is operative.

The compensation unit 51 which compensates for delay and advancement in the output of the air flow meter implements advancement compensation to compensate for a response delay in the input signal from the air flow meter 32, and calculates an air flow meter-detected flow rate Qa in grams/millisecond (g/ms). The application of advancement compensation to compensate for a response delay in a signal from the air flow meter 32 is known from JP2003-314347A, and the method described therein is applied here as is.

Figure 7:
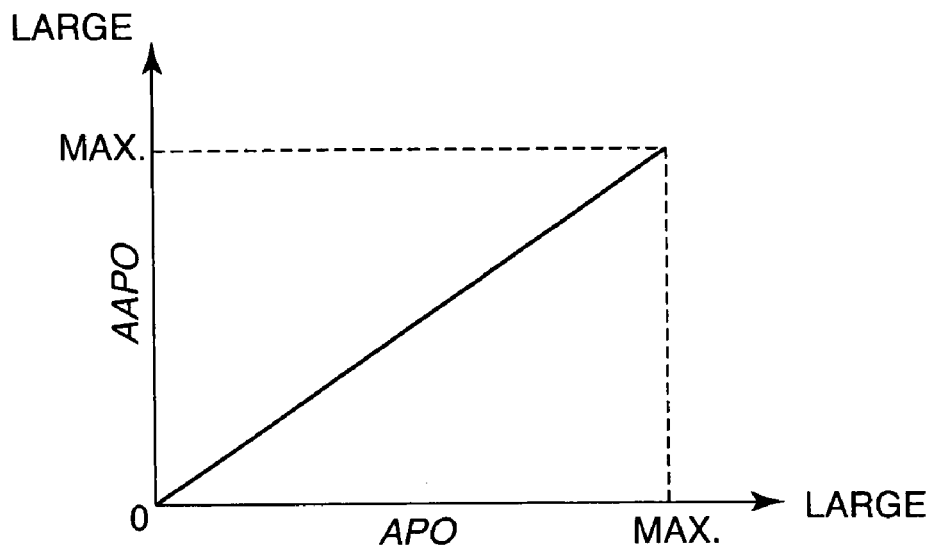
FIG. 7 is a diagram illustrating the characteristics of a map of a throttle opening area conversion value AAPO of an accelerator pedal depression amount, which is stored in the engine controller according to the first embodiment and second embodiment of this invention.

The calculation unit 52 for calculating the throttle opening area conversion value of the accelerator pedal depression amount converts the accelerator opening APO, detected by the accelerator pedal depression amount sensor 42, into an intake throttle opening area by looking up a map stored in the ROM of the engine controller 31 in advance and having the characteristics shown in FIG. 7. The obtained value is set as a throttle opening area conversion value AAPO in square meters ($m^2$).

Figure 8:
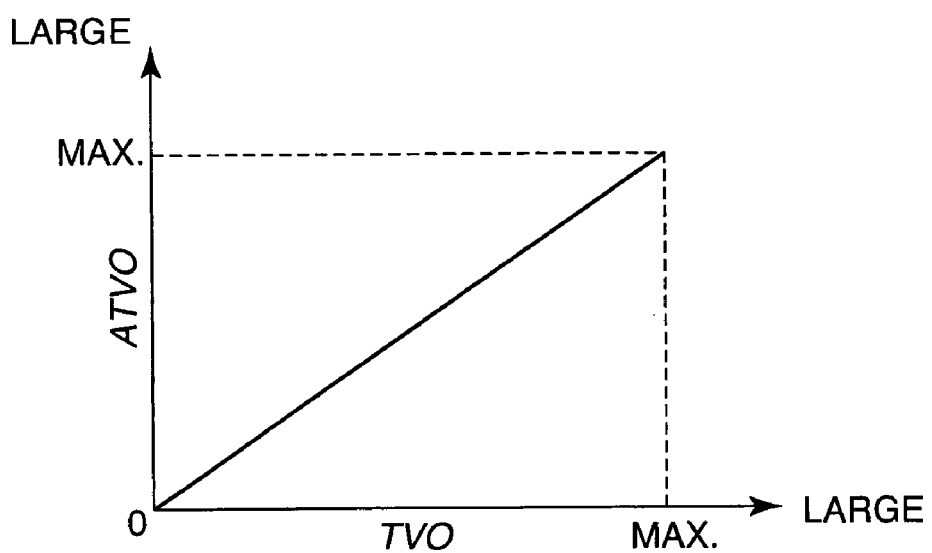
FIG. 8 is a diagram illustrating the characteristics of a map of a throttle opening area ATVO, which is stored in the engine controller according to the first embodiment and second embodiment of this invention.

The throttle opening area calculation unit 53 determines a throttle opening area ATVO ($m^2$) from the throttle opening TVO of the intake throttle 23, detected by the throttle opening sensor 36, by looking up a map stored in the ROM of the engine controller 31 in advance and having the characteristics shown in FIG. 8.

The area ratio calculation unit 54 calculates a ratio AAPO/ATVO of the throttle opening area conversion value AAPO and the throttle opening area ATVO.

Here, the throttle opening area conversion value. AAPO is a virtual area determined by the accelerator opening APO. The throttle opening area ATVO is a real area determined by the throttle opening TVO of the intake throttle 23. The throttle opening area conversion value AAPO is set to correspond to the throttle opening area ATVO at a ratio of 1:1. In other words, in FIGS. 7 and 8 the maximum value of the accelerator opening APO is equal to the maximum value of the throttle opening TVO, and the maximum value of the throttle opening area conversion value AAPO is equal to the maximum value of the throttle opening area ATVO. Hence, the accelerator area AAPO when the accelerator pedal 41 is depressed fully is equal to the throttle opening area ATVO when the intake throttle 23 is fully open. Further, the throttle opening area conversion value AAPO when the accelerator pedal 41 is depressed halfway is equal to the throttle opening area ATVO when the intake throttle 23 is half open.

As shown in FIG. 2A, when the internal combustion engine 1 accelerates or decelerates, the intake throttle opening TVO begins to increase later than the beginning of the increase in the accelerator opening APO by an amount of time corresponding to the response delay of the intake throttle 23.

Here, the response delay of the intake throttle opening area ATVO in relation to the throttle opening area conversion value AAPO is considered as the wasted time period T2 of the intake throttle 23. The response delay of the intake throttle 23 may be considered as a further first-order delay or multiple-order delay applied to the wasted time period T2 of the intake throttle 23. When the response delay of the intake throttle 23 is considered as the wasted time period T2 of the intake throttle 23, the waveform of the intake throttle opening TVO or the intake throttle opening area ATVO is equal to a waveform that is moved horizontally rightward of the waveform of the accelerator opening APO or the throttle opening area conversion value AAPO. When the response delay of the intake throttle 23 is considered as a first-order delay added to the wasted time period T2 of the intake throttle 23, the waveform of the accelerator opening APO differs from the waveform of the intake throttle opening TVO as shown in FIG. 2A. Alternatively, the waveform of the intake throttle opening area ATVO differs from the waveform of the throttle opening area conversion value AAPO as shown in FIG. 6A.

The pressure ratio calculation unit 55 determines a corrected pressure ratio PRA from a ratio Pma/Pa between a manifold pressure Pma corresponding to the accelerator opening, measured in pascals (Pa), to be described below, and an atmospheric pressure Pa (Pa) detected by the atmospheric pressure sensor 43, by looking up a map stored in the ROM of the engine controller 31 in advance and having the characteristics shown in FIG. 9. The pressure ratio calculation unit 56 determines a corrected pressure ratio PR from a ratio Pm/Pa between a manifold pressure Pm (Pa), to be described below, and the atmospheric pressure Pa (Pa) by looking up a map stored in the ROM of the engine controller 31 in advance and having the characteristics shown in FIG. 10.

The calculation unit 57 for calculating the ratio between the two pressure ratios calculates a ratio PRR between the corrected pressure ratio PRA and the corrected pressure ratio PR.

The calculation unit 58 for calculating the flow rate corresponding to the accelerator opening corrects the air flow meter-detected flow rate Qa according to the following equation (1), using the area ratio AAPO/ATVO and the pressure ratio PRR, and thereby calculates a flow rate Qaa (g/ms) corresponding to the accelerator opening.

$$Qaa = Qa \cdot \frac{AAPO}{ATVO} \cdot PRR \quad (1)$$

Referring to FIGS. 6A–6E, variation in the flow rate Qaa corresponding to the accelerator opening when the internal combustion engine 1 accelerates will be considered. In FIG. 6A, the throttle opening area conversion value before acceleration and the throttle opening area conversion value after acceleration are set as AAPO1 and AAPO2, respectively. The manifold pressure before acceleration and the manifold pressure after acceleration are set as a first pressure Pm1 and a second pressure Pm2, respectively. Further, for ease of calculation, the corrected pressure ratio PRA is assumed to equal Pma/Pa, and the ratio PRR between the corrected pressure ratio PRA and the corrected pressure ratio PR is assumed to equal PRA/PR=Pma/Pm. On the basis of these settings, the equation (1) can be replaced by the following equation (2).

$$Qaa = Qa \cdot \frac{AAPO}{ATVO} \cdot \frac{Pma}{Pm} \quad (2)$$

The area ratio AAPO/ATVO on the right side of the equation (2) increases gradually from 1.0 as the throttle opening area conversion value increases from the area before acceleration AAPO1 to the area after acceleration AAPO2. After reaching the area after acceleration AAPO2, the throttle opening area conversion value maintains a constant value until the intake throttle opening area ATVO begins to increase. The area ratio AAPO/ATVO decreases gradually after the intake throttle opening area ATVO begins to increase until the intake throttle opening area ATVO matches the second throttle opening area conversion value AAPO2. When the intake throttle opening area ATVO matches the area after acceleration AAPO2, the area ratio AAPO/ATVO returns to 1.0.

Meanwhile, the pressure ratio Pma/Pm gradually increases from 1.0 as the manifold pressure Pma corresponding to the accelerator opening increases from the first pressure Pm1 to the second pressure Pm2. After reaching the second pressure Pm2, the manifold pressure Pma corresponding to the accelerator opening maintains a constant value until the manifold pressure Pm begins to increase. The pressure ratio Pma/Pm decreases gradually after the manifold portion pressure Pm begins to increase until the manifold portion pressure Pm matches the second pressure Pm2. When the manifold pressure Pm matches the second pressure Pm2, the pressure ratio Pma/Pm returns to 1.0.

The flow rate Qaa corresponding to the accelerator opening is commensurate with the area ratio AAPO/ATVO and pressure ratio ratio Pma/Pm, which change in the manner described above. Accordingly, as shown by the waveform in FIG. 6C, the flow rate Qaa corresponding to the accelerator opening begins to rise rapidly at the time t1, reaches a peak, and then decreases gradually to match the air flow meter flow rate Qa.

Thus the flow rate Qaa corresponding to the accelerator opening takes a value obtained by advancing the air flow meter flow rate Qa, or more specifically a value obtained by advancing the air flow meter flow rate Qa by the wasted time period T2 of the intake throttle 23, until the phase of change in the air flow meter flow rate Qa matches the phase of change in the accelerator opening APO.

Here, as described above, the corrected pressure ratios PRA and PR are used instead of the pressure ratios Pma/Pa and Pm/Pa. The corrected pressure ratios PRA and PR are set to take small values when the pressure ratios Pma/Pa and Pm/Pa are in the vicinity of 1.0. The reason for this setting is as follows. The region in which the pressure ratios Pma/Pa and Pm/Pa are in the vicinity of 1.0 is the high-load region of the internal combustion engine 1, and the air flow rate in the high-load region is smaller than the flow rate Qaa corresponding to the accelerator opening calculated in the equation (1). Hence, by using the corrected pressure ratios PRA and PR, which decrease as the pressure ratios Pma/Pa and Pm/Pa near 1.0, the flow rate Qaa corresponding to the accelerator opening in the high-load region can be brought closer to the actual air flow rate.

Figure 9:
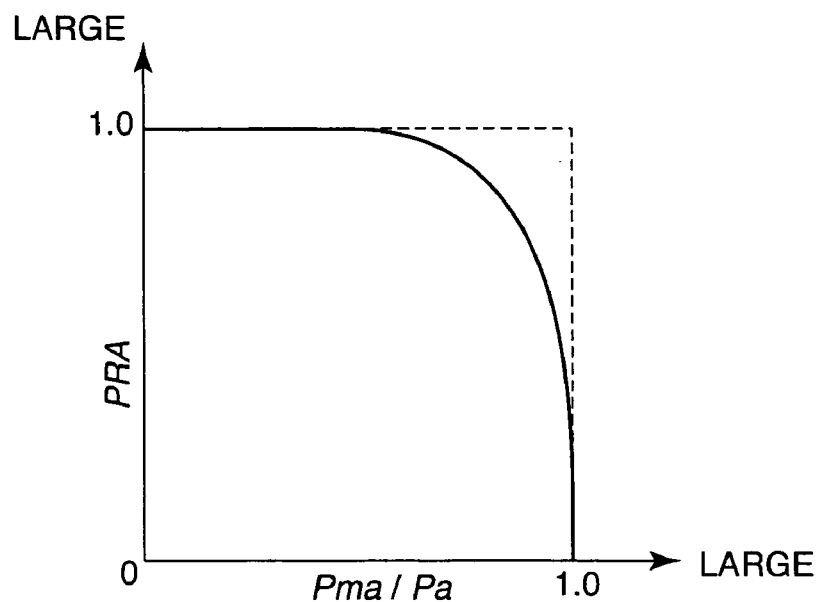
FIG. 9 is a diagram illustrating the characteristics of a map of a corrected pressure ratio PRA, which is stored in the engine controller according to the first embodiment and second embodiment of this invention.
Figure 10:
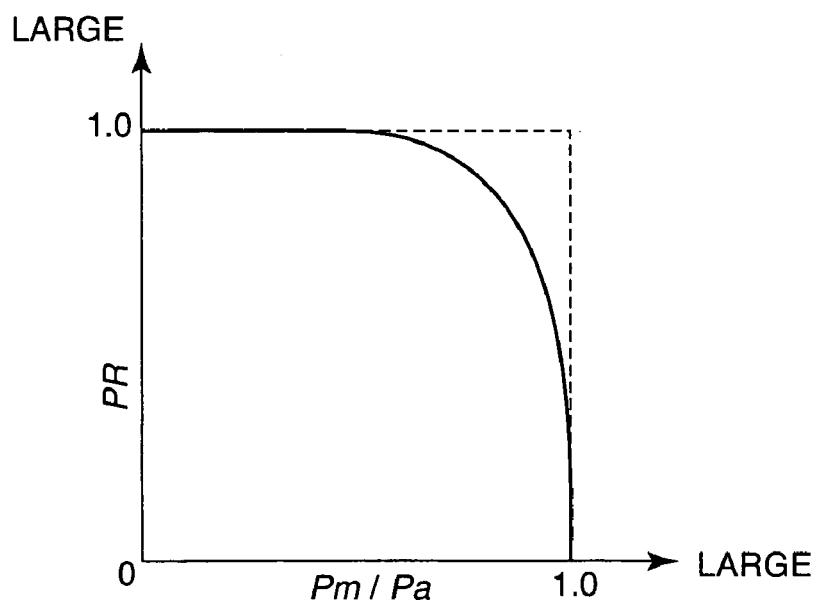
FIG. 10 is a diagram illustrating the characteristics of a map of a corrected pressure ratio PR, which is stored in the engine controller according to the first embodiment and second embodiment of this invention.

The characteristics of the corrected pressure ratio PRA, shown in FIG. 9, are identical to the characteristics of the corrected pressure ratio PR, shown in FIG. 10, and these characteristics are dependent on the flow rate characteristics of the intake throttle 23.

The flow rate Qaa corresponding to the accelerator opening, calculated in this manner, is input into the manifold portion filling model 59. In the manifold portion filling model 59, a manifold portion air amount Cma is calculated, and the calculation unit 60 for calculating the cylinder intake air amount corresponding to the accelerator opening per combustion cycle uses the manifold portion air amount Cma to calculate the cylinder intake air amount Qca corresponding to the accelerator opening per combustion cycle in grams/cycle (g/cycle). All of the flow rate Qaa corresponding to the accelerator opening, manifold portion air amount Cma, and cylinder intake air amount Qca corresponding to the accelerator opening per combustion cycle serve as a function of the time t.

A combination of the manifold portion filling model 59 and the calculation unit 60 for calculating the cylinder intake air amount corresponding to the accelerator opening per combustion cycle is known from JP2001-50091A, published by the Japan Patent Office in 2001. Here, this prior art is applied to constitute the manifold portion filling model 59 and the calculation unit 60 for calculating the cylinder intake air amount corresponding to the accelerator opening per combustion cycle as shown in FIG. 5. The differences between FIG. 5 and the prior art are that the flow rate Qaa corresponding to the accelerator opening is used in place of the air flow meter flow rate Qa as the input value of the manifold portion filling model 59, and that the manifold portion filling model 59 comprises a manifold portion pressure calculation unit 83 and a calculation unit 84 for calculating a manifold portion pressure corresponding to the accelerator opening.

As a result of these differences, as shown in FIG. 2C, a value obtained by advancing the cylinder intake air amount Qc per combustion cycle is calculated until the phase of change in the cylinder intake air amount Qc per combustion cycle matches the phase of change in the accelerator opening APO. In other words, a value obtained by advancing the cylinder intake air amount Qc per combustion cycle by the wasted time period T2 of the intake throttle 23 is calculated. Here, the calculated value is the cylinder intake air amount Qca corresponding to the accelerator opening per combustion cycle. As described above, the wasted time period T2 is set in advance as a constant value.

Next, referring to FIG. 5, the constitutions of the manifold portion filling model 59 and the calculation unit 60 for calculating the cylinder intake air amount corresponding to the accelerator opening per combustion cycle will be described.

The manifold portion filling model 59 comprises a manifold portion inflowing air amount calculation unit 81 and a manifold portion air amount balance calculation unit 82. The calculation unit 60 for calculating the cylinder intake air amount corresponding to the accelerator opening per combustion cycle comprises a calculation unit 85 for calculating the cylinder intake air amount corresponding to the accelerator opening, a weighted average processing unit 86, and a unit conversion unit 87. Each of the blocks shown in FIG. 5 shows a function of the engine controller 31 as a virtual unit, and hence these blocks do not exist physically.

By means of the constitutions described above, the manifold portion filling model 59 and calculation unit 60 for calculating the cylinder intake air amount corresponding to the accelerator opening per combustion cycle calculate the cylinder intake air amount Qca (g/cycle) corresponding to the accelerator opening per combustion cycle repeatedly, at one millisecond intervals while the internal combustion engine 1 is operative.

With respect to the calculations described above that are executed by the engine controller 31, the term manifold portion is a collective designation of the intake collector 2, intake manifold 3, and intake port 4. The manifold pressure Pm denotes the pressure in the manifold portion.

The volume of the manifold portion is set as Vm ($m^3$), the air amount in the manifold portion is set as Cm (g), and the temperature of the manifold portion is set as Tm (K). The pressure, volume, and temperature of the cylinder 5 are set as Pc (Pa), Vc ($m^3$), and Tc (K), respectively. It is assumed that relationships of Pm=Pc and Tm=Tc are established between the manifold portion and the cylinder 5.

The manifold portion inflowing air amount calculation unit 81 calculates an amount of air Caa (g) flowing into the manifold portion by multiplying a calculation cycle $\Delta t$, i.e. one millisecond, by the flow rate Qaa corresponding to the accelerator opening, in accordance with the following equation (3).

$$Caa = Qaa \cdot \Delta t \quad (3)$$

The manifold portion air amount balance calculation unit 82 calculates a manifold portion air amount $Cma_{(n)}$ (g) using the following equation (4) by adding the air amount Caa (g) to a previous value $Cm_{(n-1)}$ of the manifold portion air amount, and then subtracting a cylinder intake air amount $Cca_{(n)}$ (g) corresponding to the accelerator opening which flows from the manifold portion into the cylinder 5.

$$Cma_{(n)} = Cm_{(n-1)} + Caa - Cca_{(n)} \quad (4)$$

A cylinder intake air amount $Cca_{(n-1)}$ corresponding to the accelerator opening on the right side of the equation (4) is the cylinder intake air amount Cca corresponding to the accelerator opening calculated by the calculation unit 85 for calculating the cylinder intake air amount corresponding to the accelerator opening during the preceding control cycle, that is a period corresponding to one calculation cycle $\Delta t$ ago.

The calculation unit 85 for calculating the cylinder intake air amount corresponding to the accelerator opening calculates the cylinder intake air amount $Cca_{(n)}$ (g) corresponding to the accelerator opening using the manifold portion air amount $Cma_{(n)}$ (g), the volume Vc (m³) of the cylinder 5, and the volume Vm (m³) of the manifold portion, in accordance with the following equation (5).

$$Cca_{(n)} = Vc \cdot \frac{Cma_{(n)}}{Vm} \tag{5}$$

Both Vc and Vm are fixed values.

The equation (5) is determined in the following manner. The gas equation of state is expressed as P·V=C·R·T. P denotes pressure, V denotes volume, C denotes the number of moles in the gas, R denotes the gas constant, and T denotes the temperature of the gas. This relationship may be rewritten as the following relation (6).

$$C = P \cdot \frac{V}{R \cdot T} \tag{6}$$

By applying this to the cylinder 5, the number of moles in the cylinder 5, or in other words an air amount Cc, can be determined using the following equation (7).

$$Cc = Pc \cdot \frac{Vc}{R \cdot Tc} \tag{7}$$

As described above, the pressure Pc of the cylinder 5 and the pressure Pm of the manifold portion are considered equal, and the temperature Tc of the cylinder 5 and the temperature Tm of the manifold portion are considered equal. Therefore, the equation (7) is rewritten as the following equation (8).

$$Cc = Pm \cdot \frac{Vc}{R \cdot Tm} \tag{8}$$

Meanwhile, the gas equation of state P·V=C·R·T leads to a relationship of P/R×T=C/V, and therefore the relationship of the following equation (9) is established in the manifold portion.

$$\frac{Pm}{R \cdot Tm} = \frac{Cm}{Vm} \tag{9}$$

By inserting the equation (9) into the equation (8), the following equation (10) is obtained.

$$Cc = Vc \cdot \frac{Pm}{R \cdot Tm} = Vc \cdot \frac{Cm}{Vm} \tag{10}$$

If the air amount Cc in the cylinder 5 is replaced by the cylinder intake air amount Cca corresponding to the accelerator opening, the above equation (6) is obtained.

The cylinder intake air amount $Cca_{(n)}$ corresponding to the accelerator opening, calculated by the calculation unit 85 for calculating the cylinder intake air amount corresponding to the accelerator opening, is used by the manifold portion air amount balance calculation unit 82 in the next calculation cycle. Thus the calculation unit 85 for calculating the cylinder intake air amount corresponding to the accelerator opening and the manifold portion air amount balance calculation unit 82 perform cyclical calculations using each others' calculated values.

The weighted average processing portion 86 subjects the cylinder intake air amount $Cca_{(n)}$ corresponding to the accelerator opening to weighted averaging in the following equation (11), and thereby calculates a weighted average value $Ccak_{(n)}$ (g) of the cylinder intake air amount corresponding to the accelerator opening.

$$CCak_{(n)} = Ccak_{(n-1)} \cdot (1-M) + Cca \cdot M \tag{11}$$

where, $Ccak_{(n)}$=weighted average value of cylinder intake air amount corresponding to accelerator opening calculated in current cycle, $Ccak_{(n-1)}$=weighted average value of cylinder intake air amount corresponding to accelerator opening calculated in preceding cycle, and M=weighted average coefficient (0<M<1).

The unit conversion unit 87 converts the weighted average value $Ccak_{(n)}$ (g) of the cylinder intake air amount corresponding to the accelerator opening to the cylinder intake air amount Qca (g/cycle) corresponding to the accelerator opening per combustion cycle, or in other words per 720-degree crank angle in a four-cylinder engine, using the engine rotation speed Ne (rpm), in accordance with the following equation (12). In so doing, the weighted average value $Ccak_{(n)}$ (g) of the cylinder intake air amount corresponding to the accelerator opening is related to the calculation cycle.

$$Qca = \frac{Ccak}{\left(\frac{120}{Ne}\right)} \tag{12}$$

The manifold portion pressure calculation unit 83 calculates the manifold portion pressure Pm (Pa) using the manifold portion air amount $Cma_{(n)}$ (g), the temperature Tm (K) of the manifold portion, detected by the temperature sensor 44, and the volume Vm (m³) of the manifold portion, in accordance with the following equation (13).

$$Pm = Cma \cdot R \cdot \frac{Tm}{Vm} \tag{13}$$

The equation (13) is a variant of the equation (9).

The calculation unit 84 for calculating the manifold portion pressure corresponding to the accelerator opening calculates the manifold portion pressure Pma (Pa) corresponding to the accelerator opening, which is obtained by advancing the manifold portion pressure Pm by the wasted time period T2 of the intake throttle 23.

Thus the manifold portion filling model 59 and calculation unit 60 for calculating the cylinder intake air amount corresponding to the accelerator opening per combustion cycle calculate the cylinder intake air amount Qca (g/cycle) corresponding to the accelerator opening per combustion cycle, the manifold portion pressure Pm (Pa), and the manifold portion pressure Pma (Pa) corresponding to the accelerator opening. It should be noted, however, that the cylinder intake air amount Qca (g/cycle) corresponding to the accelerator opening per combustion cycle calculated here serves as a function which changes in the manner shown in FIG. 2C in accordance with the time t, and is therefore not a single numerical value.

Referring back to FIG. 3, the wasted time calculation unit 63 calculates the wasted time period T1 from the engine rotation speed Ne (rpm) and the wasted time period T2 of the intake throttle 23 using the following equation (14).

$$T1 = T2 - \frac{60 \cdot 1000}{Ne} \cdot \frac{X1}{360} \tag{14}$$

where, X1=preliminary crank angle interval (degree).

In FIGS. 2C and 6C, the preliminary crank angle interval X1 corresponds to the crank angle interval from the fuel injection timing IT to closing of the intake valve 15. On the right side of the equation (14), the second item 60 is a coefficient for converting minutes into seconds, 1000 is a coefficient for converting seconds into milliseconds, and 360 is a coefficient for converting the crank angle interval into a rotation speed.

When the fuel injection timing IT is determined in advance and a valve opening/closing timing as well as a valve lift amount of the intake valve 15 do not vary during the operation of the internal combustion engine 1, the preliminary crank angle interval X1 takes a fixed value of 250 degrees, for example.

As shown in FIG. 2C, the required injection amount calculation unit 61 first calculates the cylinder intake air amount Qca (g/cycle) corresponding to the accelerator opening per combustion cycle at a time earlier than the time t2, which is a known value, by the wasted time period T1, on the basis of the cylinder intake air amount Qca (g/cycle) corresponding to the accelerator opening per combustion cycle and the wasted time period T1. As described above, the cylinder intake air amount Qca corresponding to the accelerator opening per combustion cycle, provided by the calculation unit 60, is a function of the time t. The required injection amount calculation unit 61 calculates a specific numerical value Qc1 (g/cycle) of the cylinder intake air amount Qca corresponding to the accelerator opening per combustion cycle by applying a time t=t2−T1 to the function.

The required injection amount calculation unit 61 then determines an injection amount Tpf1 (ms) corresponding to the accelerator opening for realizing the stoichiometric air-fuel ratio by dividing Qc1 (g/cycle) by the 14.7 of the stoichiometric air-fuel ratio, in accordance with the following equation (15). The required injection amount Tpf1 is expressed as a fuel injection pulse width.

$$Tpf1 = \frac{Qc1}{14.7} \cdot K1 \tag{15}$$

where, K1=coefficient for converting air amount into fuel injection pulse width (fixed value).

The fuel injection amount calculation unit 64 calculates a fuel injection amount Ti (ms) for sequential injection and synchronous injection using the required injection amount Tpf1 (ms) calculated by the required injection amount calculation unit 61, in accordance with the following equation (16).

$$Ti = (Tpf1 + Kathos) \cdot Tfbya \cdot (\alpha + \alpha m - 1) \cdot 2 + Ts \tag{16}$$

where,
Kathos=transitional correction amount (ms),
Tfbya=target equivalence ratio,
α=air-fuel ratio feedback correction coefficient,
αm=learned value of air-fuel ratio feedback correction coefficient,
Ts=ineffective pulse width (ms), and
Tpf=required injection amount (ms).

The equation (16) is a well-known equation for calculating a fuel injection amount through feedback correction of the air-fuel ratio. It should be noted, however, that in the prior art, a fuel injection amount advanced ten milliseconds from the closing of the intake valve is inserted into the equation in place of the required injection amount Tpf. The transitional correction amount Kathos is a value for the purpose of wall flow correction. The target equivalence ratio Tfbya is a value corresponding to the target air-fuel ratio. When the stoichiometric air-fuel ratio is set as the target air-fuel ratio, the target equivalence ratio Tfbya is set to 1.0, when a lean air-fuel ratio is set as the target air-fuel ratio, the target equivalence ratio Tfbya is set to a value less than 1.0, and when a rich air-fuel ratio is set as the target air-fuel ratio, the target equivalence ratio Tfbya is set to a value greater than 1.0.

The engine controller 31 outputs a fuel injection pulse signal corresponding to the fuel injection amount Ti (ms) calculated in this manner to the fuel injector 21 at the injection timing IT.

The cylinder intake air amount calculation unit 65 calculates a value obtained by retarding the cylinder intake air amount Qca corresponding to the accelerator opening per combustion cycle by the wasted time period T2 (ms) of the intake throttle 23 as the cylinder intake air amount Qc (g/cycle).

The calculation unit 62 for calculating the injection amount corresponding to the cylinder intake air amount calculates a value obtained by retarding an injection amount Tca corresponding to the accelerator opening, determined in the equation (14), by the wasted time period T2 of the intake throttle 23 as an injection amount Tp (ms) corresponding to the cylinder intake air amount. The injection amount Tp is expressed as a fuel injection pulse width.

The cylinder intake air amount Qc, calculated by the cylinder intake air amount calculation unit 65, and the injection amount Tp corresponding to the cylinder intake air amount, calculated by the calculation unit 62 for calculating the injection amount corresponding to the cylinder intake air amount, are values calculated for the purpose of fuel injection control during a normal operation, and are not used in fuel injection control during a transitional operation.

Although not shown in FIG. 3, the engine controller 31 preferably distinguishes between a normal operation and a transitional operation. Thus the engine controller 31 calculates the fuel injection amount Ti using the cylinder intake air amount Qc and the injection amount Tp corresponding to the cylinder intake air amount during a normal operation, similarly to the prior art, and calculates the fuel injection amount Ti using the cylinder intake air amount Qca corresponding to the accelerator opening per combustion cycle and the required injection amount Tpf during a transitional operation.

As described above, in this invention the fuel injection amount is determined on the basis of the accelerator opening APO at least during transitional operations, and hence in comparison with the prior art, in which the fuel injection amount is determined on the basis of the air flow meter-detected flow rate, which changes in phase with the throttle opening TVO, change in the cylinder intake air amount can be grasped at an earlier timing, enabling early setting of a fuel injection amount which corresponds to the change in the cylinder intake air amount. As a result, the precision with which the air-fuel ratio of the internal combustion engine is controlled during transitional operations such as acceleration and deceleration is improved.

Incidentally, the wasted time period T1, calculated by the wasted time period calculation unit 63 in the equation (14), decreases as the engine rotation speed Ne falls. When the engine rotation speed Ne falls to or below a certain value, the wasted time period T1 takes a negative value. As described above, the wasted time period T1 is a period of delay processing which is inserted by the engine controller 31 to synchronize the cylinder intake air amount Qca corresponding to the accelerator opening with the injection timing IT, and therefore it is logically impossible for the wasted time period T1 to take a negative value. Hence, when the wasted time period T1 takes a negative value, the engine controller 31 delays the start-up timing of the intake throttle 23, or in other words change in ATVO in FIG. 6A.

More specifically, this processing is performed when the condition shown in the following equation (17), derived from the equation (10), is established.

$$T2 - \frac{60 \cdot 1000}{Ne} \cdot \frac{X1}{360} < 0 \tag{17}$$

The equation (17) is further transformed into the following equation (18).

$$Ne < \frac{500}{3} \cdot \frac{X1}{T2} \tag{18}$$

The engine controller 31 delays the start-up timing of the intake throttle 23 until the items on the left and right sides of the equation (18) are equal. As a result, the wasted time period T2 increases.

Figure 4:
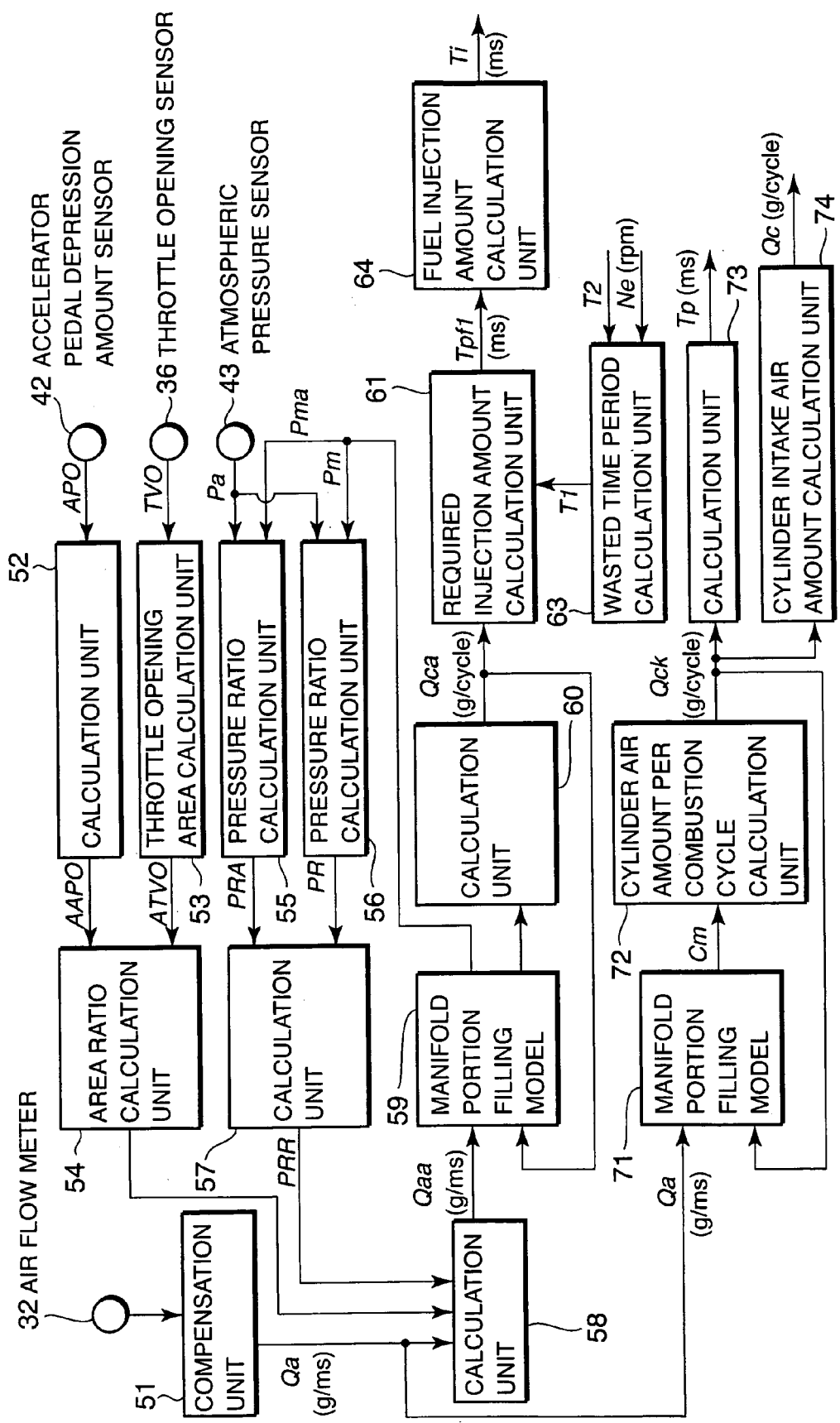
FIG. 4 is similar to FIG. 3, but shows a second embodiment of this invention.

Next, referring to FIG. 4, a second embodiment of this invention will be described.

In this embodiment, a manifold portion filling model 71, a cylinder air amount per combustion cycle calculation unit 72, a calculation unit 73 for calculating the injection amount corresponding to the cylinder intake air amount, and a cylinder intake air amount calculation unit 74 are provided in place of the calculation unit 62 for calculating the injection amount corresponding to the cylinder intake air amount and the cylinder intake air amount calculation unit 65 of the first embodiment. The manifold portion filling model 71 and cylinder air amount per combustion cycle calculation unit 72 are constituted using the known techniques disclosed in the aforementioned JP2001-50091A without modification.

In the first embodiment, the injection amount Tp (ms) corresponding to the cylinder intake air amount is calculated from the cylinder intake air amount Qca corresponding to the accelerator opening per combustion cycle, but in this embodiment, the injection amount Tp (ms) corresponding to the cylinder intake air amount is calculated from the air flow meter-detected flow rate Qa, similarly to the prior art.

In other words, the manifold portion filling model 71 and cylinder air amount per combustion cycle calculation unit 72 calculate a cylinder intake air amount Qck (g/cycle) per combustion cycle from the air flow meter-detected flow rate Qa.

The calculation unit 73 for calculating the injection amount corresponding to the cylinder intake air amount calculates the injection amount Tp (ms) corresponding to the cylinder intake air amount on the basis of the cylinder intake air amount Qck (g/cycle) per combustion cycle using the following equation (19).

$$Tp = \frac{Qck}{14.7} \cdot K1 \tag{19}$$

where, K1=coefficient for converting air amount into fuel injection pulse width (fixed value).

The equation (19) is obtained by replacing the cylinder intake air amount Qc1 corresponding to the accelerator opening per combustion cycle of the equation (15) with the cylinder intake air amount Qck per combustion cycle.

The cylinder intake air amount calculation unit 74 outputs the cylinder intake air amount Qck per combustion cycle without further modification as the cylinder intake air amount Qc (g/cycle).

This embodiment is identical to the first embodiment in that the fuel injection amount Ti (ms) is calculated on the basis of the cylinder intake air amount Qca corresponding to the accelerator opening at least during transitional operations, and therefore similar favorable effects to those of the first embodiment are obtained in relation to improvements in the precision of air-fuel ratio control during transitional operations.

Next, referring to FIGS. 11A–11D and FIG. 12, a third embodiment of this invention will be described.

In the first and second embodiments, this invention was applied to an internal combustion engine which comprises the intake throttle 23 as the claimed intake air amount regulating mechanism. In this embodiment, on the other hand, this invention is applied to a so-called non-throttle internal combustion engine that does not comprise the intake throttle 23, but comprises instead a valve timing control mechanism 27, which operates in accordance with the accelerator opening APO, as the intake air amount regulating mechanism.

First, referring to FIGS. 11A–11D, fuel injection control in an engine comprising the valve timing control mechanism 27 will be considered. The valve timing control mechanism 27 functions to modify the opening timing and closing timing of the intake valve 15. The construction of the valve timing control mechanism 27 is known by JP2003-314347A.

Due to the mechanism of the valve timing control mechanism 27, the crank angle interval from an opening timing IVO of the intake valve 15 to a closing timing IVC of the intake valve 15 is constant. Hence in FIGS. 11A–11D, the target values are represented by the closing timing IVC of the intake valve 15.

Figure 12:
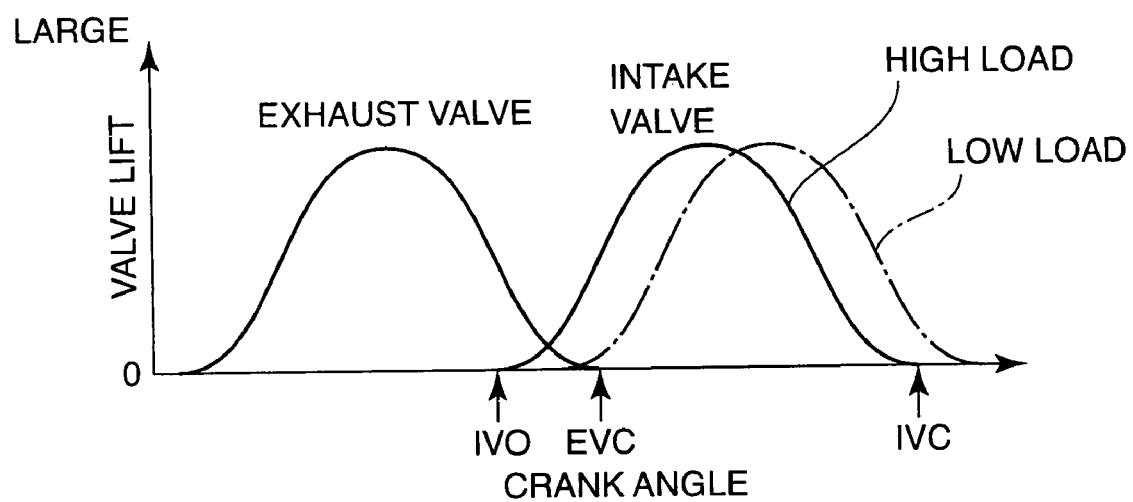
FIG. 12 is a diagram illustrating lift characteristics of an intake valve and an exhaust valve in an internal combustion engine comprising a valve timing control mechanism.

A method of setting target values relating to the opening timing and closing timing of an intake valve in accordance with operating conditions that are prescribed by the rotation speed and load of an internal combustion engine is disclosed in JP2003-129871A and JP2003-65131A, published by the Japan Patent Office in 2003, and JP1999-002140A, published by the Japan Patent Office in 1999. To put it simply, as shown in FIG. 12, when the internal combustion engine accelerates from a low-load condition to a high-load condition, the respective target values of the opening timing and closing timing of the intake valve 15 are advanced so that the valve overlap between the intake valve 15 and exhaust valve 16 increases.

FIGS. 11A–11D show fuel injection amount control performed with the valve timing control mechanism 27 in a case where a target opening timing IVOm of the intake valve 15 changes from a first opening timing IVOm1 to a second target opening timing IVOm2, and in accordance therewith, a target closing timing IVCm changes from a first closing timing IVCm1 to a second closing timing IVCm2.

Similarly to the response delay of the intake throttle 23 in the first and second embodiments, a response delay Tv2 also exists in the valve timing control mechanism 27. Specifically, this response delay last between forty and fifty milliseconds. When the engine controller 31 demands modification of the target opening timing IVOm of the intake valve 15 from the first opening timing IVOm1 to the second target opening timing IVOm2 at a time t10, an actual opening timing IVOr begins to change at a time t14. The same phenomenon occurs with the target closing timing IVCm. The period lasting from the time t10 to the time t14 is the response delay period Tv2. Hereafter, the response delay period Tv2 will be referred to as a wasted time period Tv2. It should be noted that in FIG. 11D, similarly to FIG. 2C, the cylinder intake air amount Qc and required injection amount Tpf are drawn at the same height.

As regards the valve timing control mechanism 27, if the fuel injection amount is calculated on the basis of an instruction to modify the timing of the target opening timing IVOm and target closing timing IVCf, output in accordance with the accelerator opening APO, then the required injection amount can be calculated in accordance with these timings prior to the actual opening timing IVOr and closing timing IVCr of the intake valve 15.

Figure 11:
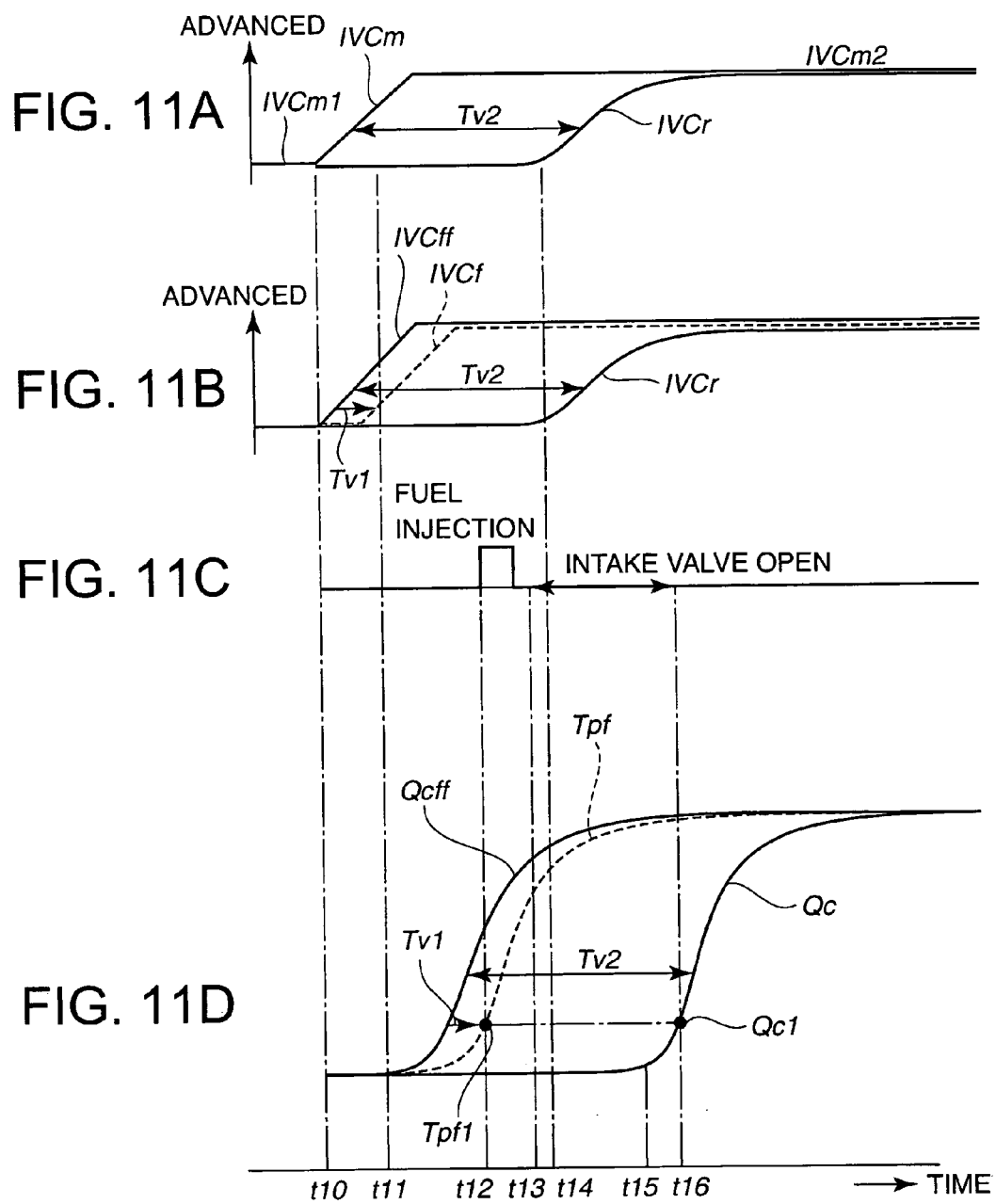
FIGS. 11A–11D are timing charts illustrating the content of calculations for calculating a fuel injection amount during engine acceleration, which are executed by an engine controller according to a third embodiment of this invention.

More specifically, as shown in FIG. 11B, an opening timing preliminary value IVOff and a closing timing preliminary value IVCff are envisaged as values obtained by advancing the opening timing IVOr and closing timing IVCr of the intake valve 15 respectively by the response delay period Tv2. Further, a virtual opening timing IVOf and a virtual closing timing IVCf, which serve as the calculation basis for the required fuel injection amount Tpf1, are set as shown by the broken line in the drawing by subjecting the timings IVOff and IVCff to delay processing corresponding to a wasted time period Tv1 for synchronization with the required injection amount Tpf. The required injection amount Tpf1 is then calculated from a cylinder intake air amount Qcff and these timings.

More specifically, the cylinder intake air amount Qcff corresponding to the preliminary values, shown in FIG. 11D, is determined as a function of the time t, and by specifying the time t from the wasted time period Tv1, the required injection amount Tpf1 shown in the drawing is calculated.

According also to this embodiment, the fuel injection amount Ti (ms) is calculated on the basis of the cylinder intake air amount Qca corresponding to the accelerator opening at least during transitional operations. Hence, a preferable effect is obtained as in the case of the first and second embodiments in increasing the precision of air-fuel ratio control during transitional operations of the internal combustion engine 1.

In this embodiment, this invention was applied to an internal combustion engine provided with a valve timing control mechanism 27, but this invention can be applied to an internal combustion engine provided with a variable valve lift mechanism that varies the valve lift amount of the intake valve 15.

Figure 13:
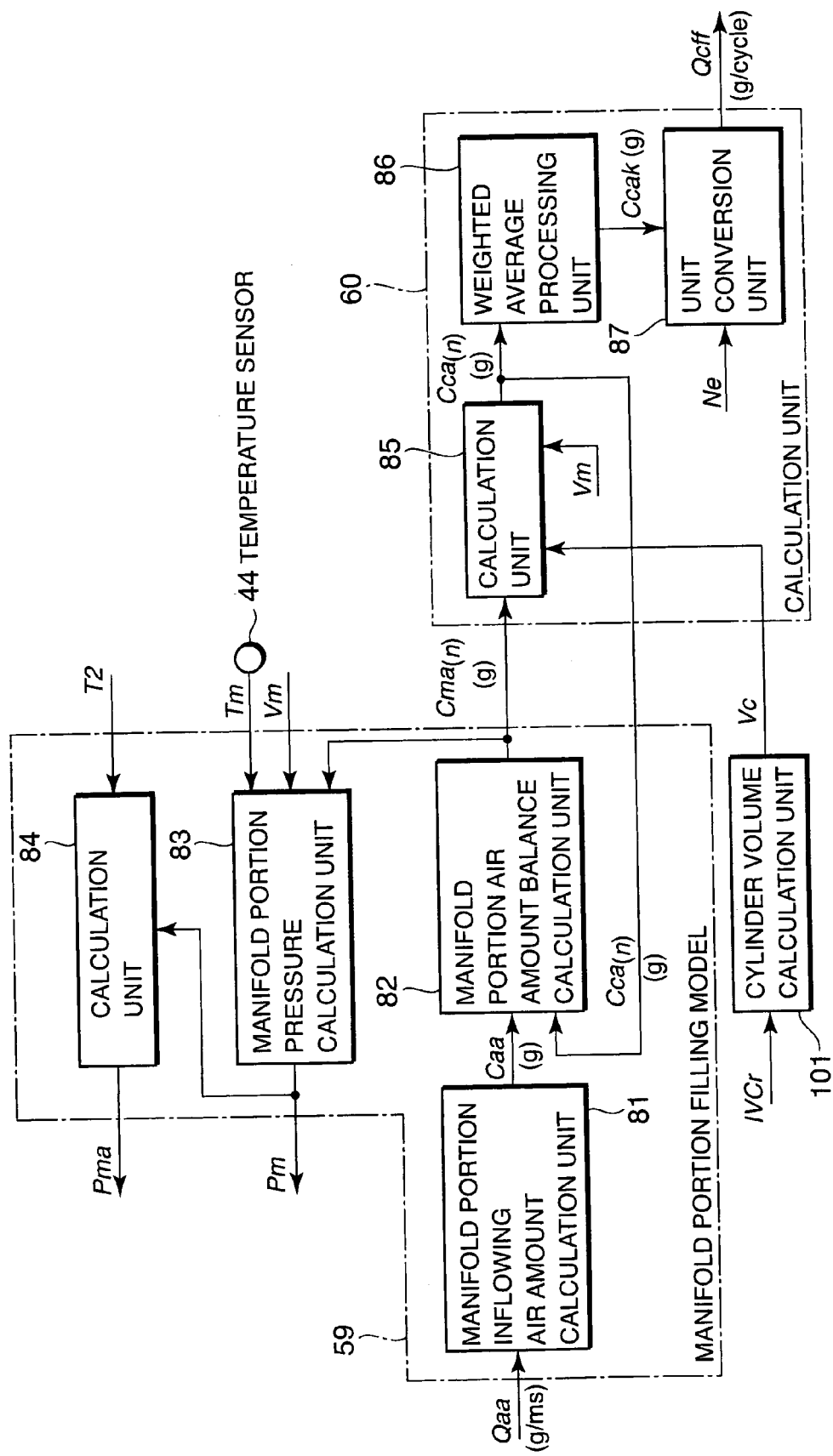
FIG. 13 is a block diagram illustrating functions of a controller according to a fourth embodiment of this invention for calculating the manifold portion air amount and the cylinder intake air amount corresponding to the accelerator opening.

Next, referring to FIGS. 13 and 14, a fourth embodiment of this invention will be described.

This embodiment corresponds to a case where this invention is applied to an internal combustion engine comprising both an intake throttle 23 and a valve timing control mechanism 27 as the claimed intake air amount regulating mechanism.

In this embodiment, the engine controller 31 comprises the same functions as those of the first embodiment, as shown in FIG. 3. However, in this embodiment, unlike the first embodiment, the volume Vc ($m^3$) of the cylinder 5, used by the calculation unit 60 for calculating the cylinder intake air amount corresponding to the accelerator opening, is not fixed for the reason to be described below. Therefore, in addition to the units shown in FIG. 5, the engine controller 31 comprises a cylinder volume calculation unit 101, shown in FIG. 13, for calculating the volume Vc of the cylinder 5 from the actual opening timing IVOr and actual closing timing IVCr of the intake valve 15.

In a physical sense, the volume of the cylinder is fixed as long as the stroke of the piston does not vary. However, the cylinder volume Vc used by the calculation unit 60 varies according to the actual opening timing IVOr and actual closing timing IVCr of the intake valve 15 for the following reason.

When the variable valve system is provided, the intake air amount of the cylinder 5 varies in accordance with the opening timing IVO and closing timing IVC in the manner shown in FIG. 12.

Moreover, a valve overlap during which both the exhaust valve 16 and intake valve 15 are open may occur as a result of advancement of the opening timing IVO. The valve overlap leads to a backflow of exhaust gas from the exhaust passage 8 into the cylinder 5. This phenomenon is known as internal Exhaust Gas Recirculation (EGR). An increase in the internal EGR amount causes a decrease in the amount of intake air flowing into the cylinder 5 through the intake valve 15. This substantially constitutes a variation in the cylinder volume Vc.

When the cylinder volume Vc varies substantially, the cylinder intake air amount Qca corresponding to the accelerator opening also varies. Hence the cylinder volume calculation unit 101 calculates the cylinder volume Vc on the basis of the actual opening timing IVOr and actual closing timing IVCr of the intake valve 15.

As regards the valve timing control mechanism 27, the opening period from the opening timing IVOr to the closing timing IVCr is constant, and therefore this calculation may be performed in accordance with the closing timing IVCr alone.

Next, referring to FIG. 14, the constitution of the cylinder volume calculation unit 101 will be described. The calculations of FIG. 13 are executed at one millisecond intervals, similarly to the calculations of the first embodiment shown in FIG. 3. Accordingly, the cylinder volume calculation unit 101 executes calculation of the fuel injection amount Ti (ms), shown in FIG. 14, also at one millisecond intervals.

Calculation of the cylinder volume Vc using the valve timing control mechanism 27 is disclosed in JP2001-050091A, published by the Japan Patent Office in 2001. Here, the disclosed calculation method is applied to calculation of the cylinder volume Vc, and a new intake valve opening/closing timing required value calculation unit 111 is added.

Figure 14:
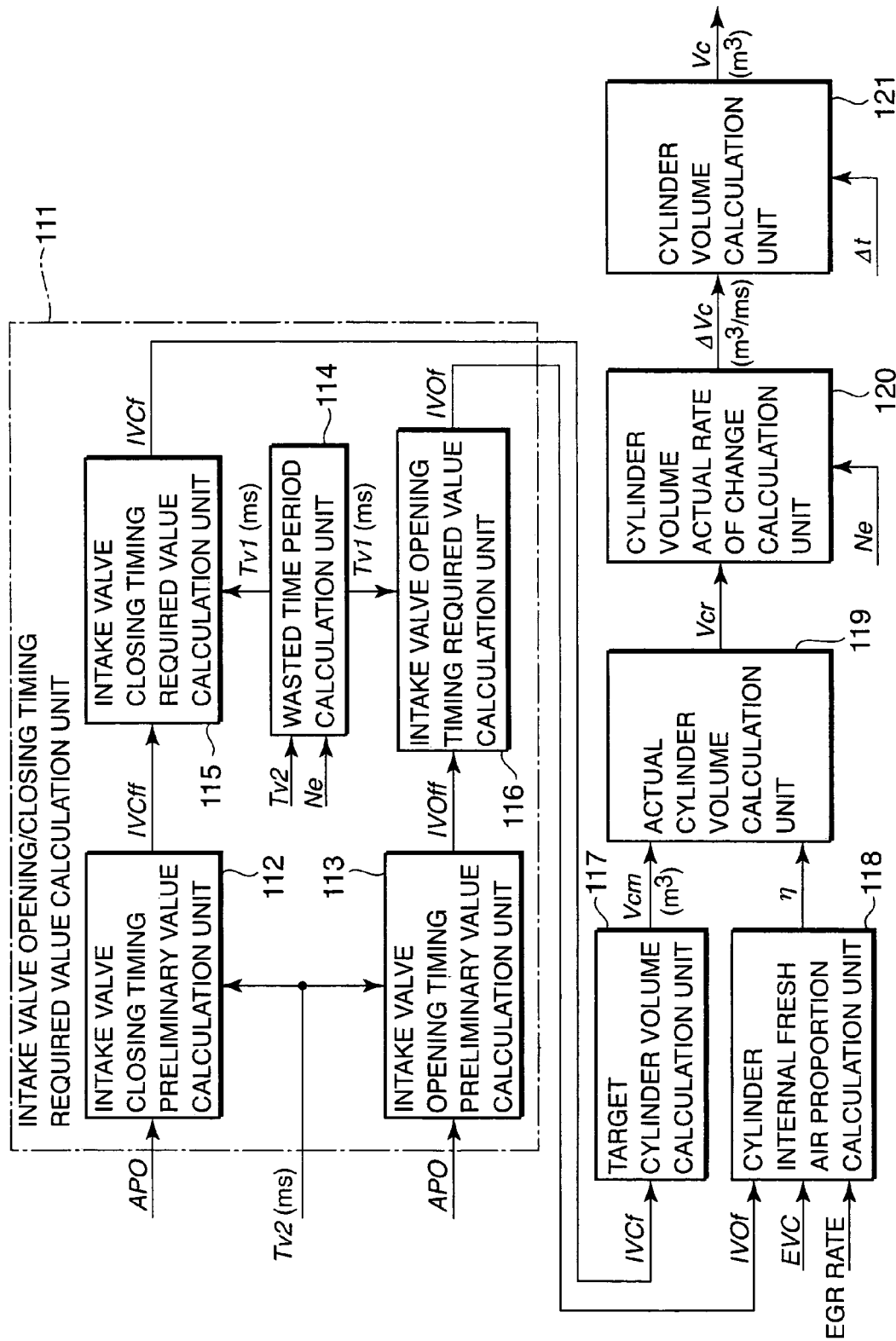
FIG. 14 is a block diagram illustrating a function of the engine controller according to the fourth embodiment of this invention for calculating a cylinder volume Vc.

Referring to FIG. 14, the intake valve opening/closing timing required value calculation unit 111 comprises an intake valve closing timing preliminary value calculation unit 112, an intake valve opening timing preliminary value calculation unit 113, a wasted time period calculation unit 114, an intake valve closing timing required value calculation unit 115, and an intake valve opening timing required value calculation unit 116.

The intake valve closing timing preliminary value calculation unit 112 calculates the intake valve closing timing preliminary value IVCff from the accelerator opening APO. Specifically, the intake valve closing timing preliminary value IVCff is a target value of the closing timing IVC of the intake valve 15 corresponding to the accelerator opening APO. It should be noted, however, that the accelerator opening APO changes with the time t, and therefore the intake valve closing timing preliminary value IVCff is also expressed as a function of the time t. Hence the intake valve closing timing preliminary value IVCff corresponds to a value obtained by advancing the actual closing timing IVCr of the intake valve 15, shown in FIG. 11A, by the wasted time period Tv2 of the valve timing control mechanism 27.

Similarly, the intake valve opening timing preliminary value calculation unit 113 calculates the intake valve opening timing preliminary value IVOff from the accelerator opening APO. Specifically, the intake valve opening timing preliminary value IVOff is a target value of the opening timing IVO of the intake valve 15 corresponding to the accelerator opening APO. However, the accelerator opening APO changes with the time t, and therefore the intake valve opening timing preliminary value IVOff is also expressed as a function of the time t. Hence the intake valve opening timing preliminary value IVOff corresponds to a value obtained by advancing the actual opening timing IVOr of the intake valve 15 by the wasted time period Tv2 of the valve timing control mechanism 27.

The intake valve closing timing required value calculation unit 115 calculates the intake valve closing timing required value IVCf, which is a value obtained by retarding the intake valve closing timing preliminary value IVCff by the wasted time period Tv1. Likewise, the intake valve opening timing required value calculation unit 116 calculates the intake valve opening timing required value IVOf, which is a value obtained by retarding the intake valve opening timing preliminary value IVOff by the wasted time period Tv1.

The wasted time period Tv1 (ms) is calculated by the wasted time period calculation unit 114 from the engine rotation speed Ne (rpm) and the wasted time period Tv2 of the valve timing control mechanism 27, in accordance with the following equation (20).

$$Tv1 = Tv2 - \frac{60 \cdot 1000}{Ne} \cdot \frac{X1}{360} \tag{20}$$

where, X1=preliminary crank angle interval (degree).

In FIG. 11C, the preliminary crank angle interval X1 corresponds to a crank angle interval extending from the fuel injection timing IT to the closing of the intake valve 15. The equation (20) is substantially identical to the equation (14) of the first embodiment.

A target cylinder volume calculation unit 117 calculates a corresponding cylinder volume from the intake valve closing timing required value IVCf as a function of the time t. This is set as a target cylinder volume Vcm (m³).

A cylinder internal fresh air proportion calculation unit 118 calculates a proportion η (%) of fresh air in the cylinder from the intake valve opening timing required value IVOf, an exhaust valve closing timing EVC (which is a fixed value), and where necessary, an EGR rate.

An actual cylinder volume calculation unit 119 calculates an actual cylinder volume Vcr (m³) by multiplying the cylinder fresh air proportion η (%) by the target cylinder volume Vcm (m³). The actual cylinder volume Vcr (m³) corresponds to the volume of the fresh air in the cylinder 5.

As described above, the valve overlap amount is determined by the exhaust valve closing timing EVC and the actual value of the intake valve opening timing IVOr. The internal EGR amount in the cylinder 5 increases as the valve overlap increases, and therefore the cylinder fresh air proportion η (%) is determined on the basis of the overlap amount.

The internal combustion engine comprising the variable valve system is capable of adjusting the internal EGR amount arbitrarily through control of the overlap amount. The internal combustion engine does not typically comprise an EGR device, or in other words an external EGR device, but in an internal combustion engine comprising an external EGR device, the cylinder fresh air proportion η (%) is also corrected in accordance with the EGR rate of the external EGR device.

A cylinder volume actual rate of change calculation unit 120 calculates an actual rate of change in the cylinder volume ΔVc (m³/ms) by multiplying the engine rotation speed Ne (rpm) by the actual cylinder volume Vcr (m³), using the following equation (21).

$$\Delta Vc = Vcr \cdot Ne \cdot K2 \tag{21}$$

where, $$K2 = \frac{1}{30} \cdot \frac{1}{1000}.$$

K2 is a constant for aligning units, ⅓₀ is a value for converting the unit of the engine rotation speed Ne from (rpm) to (180 deg/sec), and ¹⁄₁₀₀₀ is a value for converting the unit of the actual rate of change in the cylinder volume ΔVc from (m³/sec) to (m³/ms).

A cylinder volume calculation unit 121 calculates the cylinder volume Vc (m³) by multiplying the calculation cycle Δt by the actual rate of change in the cylinder volume ΔVc, using the following equation (22).

$$Vc = \Delta Vc \cdot \Delta t \tag{22}$$

The calculation cycle Δt is one millisecond. The cylinder volume Vc (m³) calculated here is also a function of the time t.

Returning to FIG. 13, the calculation unit 60 for calculating the cylinder intake air amount corresponding to the accelerator opening calculates the cylinder intake air amount Qcff corresponding to the preliminary values using the cylinder volume Vc (m³) calculated by the cylinder volume calculation unit 119 in the manner described above. The cylinder intake air amount Qcff corresponding to the preliminary values corresponds to the cylinder intake air amount Qca corresponding to the accelerator opening of the first and second embodiments. Hence the fuel injection amount Ti (ms) is then calculated, under the condition Qca=Qcff, by the required injection amount calculation unit 61, wasted time period calculation unit 63, and fuel injection amount calculation unit 64 shown in FIG. 3 or FIG. 4, in a similar manner to the first and second embodiments.

As described above, when this invention is applied to an internal combustion engine provided with both an intake throttle 23 and a valve timing control mechanism 27 as the claimed intake air amount regulating mechanism, a preferable effect on the improvement of the precision of air-fuel control during transitional operations of the engine is also obtained as in the case of the first to third embodiments.

To summarize the above description, the engine controller 31 of this invention calculates a target intake air amount of the cylinder 5 on the basis of the accelerator opening APO, and controls the intake air amount regulating mechanism, e.g., the intake throttle 23 or valve timing control mechanism 27 or both, to realize the target intake air amount. Meanwhile, on the basis of the accelerator opening APO, the engine controller 31 calculates a predicted value Qc1 of the intake air amount that is to be realized by the intake air amount regulating mechanism following control, and then controls the fuel injection amount of the fuel injector 21 to a target fuel injection amount that is based on the predicted value Qc1.

Hence, when fuel injection is performed during the time lag that occurs from change in the accelerator opening APO to change in the actual intake air amount of the cylinder 5, fuel is injected in a fuel injection amount based on the predicted value Qc1. Therefore, in comparison with conventional fuel injection control, in which the fuel injection amount is calculated on the basis of the actual intake air amount, which is dependent on the detection value of the air flow meter, the fuel injection amount is more responsive to change in the accelerator opening. As a result, the air-fuel ratio control precision during acceleration or deceleration of the internal combustion engine can be improved.

In the embodiments above, the wasted time period T2 and Tv2 correspond to the predetermined response delay in the Claims, and the wasted time period T1 and Tv1 correspond to the second delay period in the Claims.

The contents of Tokugan 2004-296866, Tokugan 2004-296849, Tokugan 2004-296860 and Tokugan 2004-296869, all of which have a same filing date of Oct. 8, 2004 in Japan are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A fuel injection control device for an internal combustion engine, the engine comprising a cylinder, an intake passage through which air is taken into the cylinder, an intake air amount regulating mechanism which regulates an intake air amount of the cylinder in accordance with an accelerator opening, a predetermined response delay existing between the accelerator opening and the intake air amount adjustment performed by the intake air amount regulating mechanism, and a fuel injector which supplies the intake air with an amount of fuel corresponding to the intake air amount, the fuel injection control device comprising:

a programmable controller programmed to:
calculate from the accelerator opening a predicted value of the intake air amount of the cylinder that is to be realized by the intake air amount regulating mechanism;
calculate a target fuel injection amount in accordance with the predicted value; and
control the fuel injector to inject a fuel in the target fuel injection amount at a predetermined injection timing.

2. The fuel injection control device as defined in claim 1, wherein the controller is further programmed to calculate a target intake air amount on the basis of the accelerator opening, and control the regulating mechanism to realize the target intake air amount.

3. The fuel injection control device as defined in claim 2, wherein the intake air amount regulating mechanism comprises an intake throttle provided in the intake passage.

4. The fuel injection control device as defined in claim 3, wherein the engine further comprises an intake valve which blocks communication between the cylinder and the intake passage at a predetermined crank angle, the device further comprises a sensor which detects a flow rate of the intake passage upstream of the intake throttle, and the controller is further programmed to:

calculate a throttle opening area conversion value from the accelerator opening;
calculate an intake throttle opening area from a throttle opening of the intake throttle;
calculate an accelerator opening cylinder intake air amount as a function of an elapsed time from a change in the accelerator opening, from a ratio between the throttle opening area conversion value and the intake throttle opening area, and the flow rate in the intake passage;
specify the elapsed time corresponding to a second delay period which is determined from the predetermined response delay and a time period extending from the fuel injection timing to a closing of the intake valve;
calculate a required injection amount corresponding to the fuel injection timing of the fuel injector on the basis of the accelerator opening cylinder intake air amount and the specified elapsed time; and
calculate the target fuel injection amount from the required injection amount.

5. The fuel injection control device as defined in claim 4, wherein the controller is further programmed to determine the second delay period in accordance with a rotation speed of the internal combustion engine.

6. The fuel injection control device as defined in claim 5, wherein the controller is further programmed to calculate the second delay period using the following equation.

$$T1 = T2 - \frac{60 \cdot 1000}{Ne} \cdot \frac{X1}{360}$$

where,
Ne=the rotation speed of the internal combustion engine, and
X1=a crank angle interval from the fuel injection timing to the closing of intake valve.

7. The fuel injection control device as defined in claim 4, wherein the engine further comprises a manifold portion through which air is taken into the cylinder from the intake passage, and the controller is further programmed to calculate the accelerator opening cylinder intake air amount from an accelerator opening-corresponding flow rate that is calculated using the following equation.

$$Qaa = Qa \cdot \frac{AAPO}{ATVO} \cdot \frac{PRA}{PR}$$

where,
Qa=the flow rate of the intake passage,
AAPO=the throttle opening area conversion value, determined from the accelerator opening,
ATVO=the throttle opening area, determined from the intake throttle opening,
PR=a pressure ratio calculated from a ratio between a pressure in the manifold portion and an atmospheric pressure, and
PRR=a pressure ratio calculated from a ratio between an accelerator opening-corresponding manifold portion pressure, which is an initial pressure of the pressure in the manifold portion, and the atmospheric pressure.

8. The fuel injection control device as defined in claim 4, wherein the controller is further programmed to delay change in the throttle opening of the intake throttle when the second delay period takes a negative value, until the second delay period becomes zero.

9. The fuel injection control device as defined in claim 1, wherein the engine further comprises an intake valve which blocks communication between the cylinder and the intake passage at a predetermined crank angle, and the intake air amount regulating mechanism comprises a valve timing control mechanism which modifies an opening/closing timing of the intake valve in accordance with the accelerator opening.

10. The fuel injection control device as defined in claim 1, wherein the engine further comprises an intake valve which blocks communication between the cylinder and the intake passage at a predetermined crank angle, and the intake air amount regulating mechanism comprises an intake throttle provided in the intake passage and a valve timing control mechanism which modifies an opening/closing timing of the intake valve in accordance with the accelerator opening.

11. The fuel injection control device as defined in claim 10, further comprising a sensor which detects a flow rate of the intake passage upstream of the intake throttle, and the controller is further programmed to:
calculate a throttle opening area conversion value from the accelerator opening;
calculate an accelerator opening cylinder intake air amount as a function of an elapsed time from a change in the accelerator opening, from the throttle opening area conversion value and the flow rate in the intake passage;
specify the elapsed time corresponding to a second delay period which is determined from the predetermined response delay and a time period extending from the fuel injection timing to a closing of the intake valve;
calculate a required injection amount corresponding to the fuel injection timing of the fuel injector on the basis of the accelerator opening cylinder intake air amount, and the specified elapsed time; and
calculate the target fuel injection amount from the required injection amount.

12. The fuel injection control device as defined in claim 11, wherein the engine further comprises a manifold portion through which air is taken into the cylinder from the intake passage, and the controller is further programmed to calculate the accelerator opening cylinder intake air amount from an accelerator opening-corresponding flow rate that is calculated using the following equation.

$$Qaa = Qa \cdot \frac{AAPO}{ATVO} \cdot \frac{PRA}{PR}$$

where,
Qa=the flow rate of the intake passage,
AAPO=the throttle opening area conversion value, determined from the accelerator opening,
ATVO=a fixed value,
PR=a pressure ratio calculated from a ratio between a pressure in the manifold portion and an atmospheric pressure, and
PRR=a pressure ratio calculated from a ratio between an accelerator opening-corresponding manifold portion pressure, which is an initial pressure of the pressure in the manifold portion, and the atmospheric pressure.

13. The fuel injection control device as defined in claim 11, wherein the controller is further programmed to calculate the accelerator opening cylinder intake air amount from the accelerator opening-corresponding flow rate on the basis of a volume of an amount of fresh air in the cylinder, which varies according to the opening/closing timing of the intake valve.

14. The fuel injection control device as defined in claim 13, wherein the controller is further programmed to calculate a target value of the opening/closing timing of the intake valve from the accelerator opening, and calculate the volume of the amount of fresh air in the cylinder on the basis of the target value.

15. A fuel injection control device for an internal combustion engine, the engine comprising a cylinder, an intake passage through which air is taken into the cylinder, an intake valve which blocks communication between the cylinder and the intake passage at a predetermined crank angle, an intake air amount regulating mechanism which regulates an intake air amount of the cylinder in accordance with an accelerator opening, a predetermined response delay existing between the accelerator opening and the intake air amount adjustment performed by the intake air amount regulating mechanism, and a fuel injector which supplies the intake air with an amount of fuel corresponding to the intake air amount, the fuel injection control device comprising:
means for calculating from the accelerator opening a predicted value of the intake air amount of the cylinder that is to be realized by the intake air amount regulating mechanism;
means for calculating a target fuel injection amount in accordance with the predicted value; and
means for controlling the fuel injector to inject a fuel in the target fuel injection amount at a predetermined injection timing.

16. A fuel injection control method for an internal combustion engine, the engine comprising a cylinder, an intake passage through which air is taken into the cylinder, an intake air amount regulating mechanism which regulates an intake air amount of the cylinder in accordance with an accelerator opening, a predetermined response delay existing between the accelerator opening and the intake air amount adjustment performed by the intake air amount regulating mechanism, and a fuel injector which supplies the intake air with an amount of fuel corresponding to the intake air amount, the fuel injection control method comprising:

calculating from the accelerator opening a predicted value of the intake air amount of the cylinder that is to be realized by the intake air amount regulating mechanism;

calculating a target fuel injection amount in accordance with the predicted value; and controlling the fuel injector to inject a fuel in the target fuel injection amount at a predetermined injection timing.

* * * * *